US 6,742,706 B2

(12) United States Patent
Sakamoto et al.

(10) Patent No.: US 6,742,706 B2
(45) Date of Patent: Jun. 1, 2004

(54) CARD READER

(75) Inventors: Kazutaka Sakamoto, Kumamoto (JP); Mikio Kawasaki, Kumamoto (JP); Hiroyuki Ueta, Tamana (JP); Sinji Arase, Tamana (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 164 days.

(21) Appl. No.: 09/945,735

(22) Filed: Sep. 5, 2001

(65) Prior Publication Data

US 2002/0030110 A1 Mar. 14, 2002

(30) Foreign Application Priority Data

Sep. 11, 2000 (JP) ........................ 2000-274630

(51) Int. Cl.⁷ ................................................. G06K 7/00
(52) U.S. Cl. ...................................... 235/439; 235/454
(58) Field of Search ................................. 235/439, 454

(56) References Cited

U.S. PATENT DOCUMENTS

| | | | | |
|---|---|---|---|---|
| 3,836,753 A | * | 9/1974 | Pass | 235/449 |
| 3,916,156 A | * | 10/1975 | Pass et al. | 235/443 |
| 4,287,409 A | * | 9/1981 | Auchinleck | 235/475 |
| 4,591,937 A | * | 5/1986 | Nakarai et al. | 360/101 |
| 5,017,764 A | * | 5/1991 | Hashimoto et al. | 235/454 |
| 5,061,842 A | * | 10/1991 | Payne | 235/449 |
| 5,089,694 A | * | 2/1992 | Zerfahs et al. | 235/486 |
| 5,362,951 A | * | 11/1994 | Kanazawa et al. | 235/449 |
| 5,691,526 A | * | 11/1997 | Evans | 235/449 |
| 5,696,369 A | * | 12/1997 | Watanabe | 235/454 |
| 6,587,135 B1 | * | 7/2003 | Suzuki et al. | 347/217 |

FOREIGN PATENT DOCUMENTS

| | | |
|---|---|---|
| JP | 09174889 | 7/1997 |
| JP | 11320931 | 11/1999 |
| JP | 2000-143068 | 5/2000 |

* cited by examiner

Primary Examiner—Karl D. Frech
Assistant Examiner—Daniel A. Hess
(74) Attorney, Agent, or Firm—Stevens, Davis, Miller & Mosher, LLP

(57) ABSTRACT

To provide a card reader adaptable to a variety of cards and excelling in card carrying ease. The card reader includes: a card passage; a carrying unit for moving a card within the passage, a data recording/reproducing unit for at least either recording data onto or reproducing data out of the card present in the passage, an image forming unit for forming a visible image on the card, and an image erasing unit for erasing any visible image formed on the card, and has a configuration of handling cards differing in thickness.

11 Claims, 18 Drawing Sheets

CARD READER

BACKGROUND OF THE INVENTION

The present invention relates to a card reader for at least either recording or reproducing data onto or out of an information recording medium, such as a card.

By virtue of their carrying convenience, cards have long been used for many different purposes, and a wide variety of cards are available. They include, for instance, prepaid cards such as telephone cards and railway ticket cards, commuter tickets, coupon tickets, point cards, bank cards, cash cards, credit cards, driver's licenses, membership cards and ID cards.

Such a card has a memory section, typically a magnetic recording layer, an optical recording layer or an IC memory, for recording and holding such information as identifying information, account balance and earned points. Whereas information recorded on any such memory section is reproduced by a dedicated card reader, the card possessor cannot directly check the information because information recorded on a magnetic recording layer, an optical recording layer or an IC memory is invisible.

The prior art provides various ways of visually marking such otherwise invisible information. For instance, the information may be printed on the card surface by one or another of various printing means such as an ink jet, thermoelectric or laser beam printer, or write once type marking may be used, such as forming a thermosensitive color developing layer on the card surface in advance and thermally recording the information thereon. The write once type marking cannot present much information because of the limitation of the space available for marking on the card surface. In view of this limitation, more recently, rewritable marking methods have come to be used. For example, a liquid crystal marking device may be formed on the card, or a thermally reversible material permitting repeated thermal printing and erasion is used for the marking purpose. By using one or another of these marking methods, not only can invisibly recorded information be visually marked on a magnetic recording layer, an optical recording layer or an IC memory but also can new information, such as an advertisement or a promotional announcement, be additionally marked in a visual way.

Furthermore, in addition to the wide variety of the uses, information recording systems and marking methods of these cards, the materials of card substrates, the position of the memory section such as a magnetic stripe or an IC chip, and the standards on the size and thickness of the card are no less diverse. The card materials, for instance, include plastics, paper and synthetic paper such as polyvinyl chloride (PVC), polyvinyl chloroacetate (PVCA), polyethylene terephthalate (PET), polycarbonate (PC) and biodegradable materials. According to JISX6301 applicable to all ID cards and JISX6303 applicable to IC cards with external terminal, the thickness is required to be 0.76 mm±0.08 mm. In a commonly known configuration, two 0.28 mm thick hard vinyl chloride sheets are stacked one over the other, and a 0.1 mm thick hard vinyl chloride sheet is stuck to each side of the paired sheets. A card of some type has an account number, expiration date and owner's name marked in an embossed way, i.e. by physically embossing parts of the card substrate to let the signs of such information show up. Besides such cards having a hard plastic as the substrate, prepaid cards, typically telephone cards, are thinner, ranging in thickness from about 0.20 to 0.28 mm.

Thus, cards have become diverse indeed. A device having functions to pick up (read) information out of, to record (write) information onto or rewrite information to be marked on such cards is a card reader.

One example of card reader according to the prior art will be cited here. FIG. 18 is a sectional side elevation view of the conventional card reader. The following description will refer to FIG. 18.

A rewrite card provided with a thermally reversible material or the like is used as a card 1, and the card 1 here has a magnetic recording layer, too. A rewrite card has a configuration wherein a visible image is formed by, for instance, heating to or above a prescribed temperature, and the formed image can be made invisible by heating the card within a prescribed temperature range for a prescribed length of time.

The card 1 inserted through an inlet 2 is carried within a passage 7, which is composed of a guide assembly 6, by drive rollers 3, 4 and 5 and pinch rollers 8, 10 and 12 opposite the respective drive rollers.

Reference numeral 56 denotes a data recording/reproducing unit for recording or reproducing magnetic information onto or out of the card 1; and 58, a magnetic head pinch roller opposite the magnetic head 56. A printing section 37 for printing on the card 1 is fitted to a thermal head holder 60 and rotated by a shaft 96.

Further, an erasing section 49 for erasing information printed on the card is fitted to an erasing head holder 79, which is linked by a shaft 97 to the thermal head holder 60 and is interlocked with a thermal head 37.

The thermal head 37 and the erasing head 49 are so configured as to be protruded into and recessed from the passage 7 by a lifting motor 98 via a cam 99.

When printing on or erasing from the card 1, the thermal head 37 and the erasing head 49 are pressed and energized by springs, which are hooked onto holders, via the card 1 against a platen 31 positioned opposite the thermal head 37 and a roller 43 positioned opposite the erasing head 49, and protruded into the passage 7 to print or erase prescribed information onto or out of the card 1.

Upon completion of printing or erasion, the thermal head 37 and the erasing head 49 are recessed from the passage 7 by the lifting motor 98 via the cam 99. The permissible upper limit of the pinching load of the thermal head 37 and the erasing head 49 is about 5 N because of constrains of the mechanism.

Each such card reader according to the prior art is designed or set for exclusive use with a particular card type. For instance, thinner cards of 0.20 to 0.28 mm in thickness are used with a card reader exclusively intended for them, and similarly thicker cards of 0.68 to 0.84 mm have their own card reader intended specifically for them. However, these conventional card readers involve the following problems.

As mentioned above, a great variety of cards are in use, and they differ in thickness, substrate material, the presence or absence and, if present, the position of a memory section such as a magnetic recording layer, an optical recording layer or an IC memory, and the presence or absence and, if present, the position of a marking section such as a thermosensitive color developing layer, a liquid crystal marking device or a thermally reversible material.

In a card reader exclusively intended for cards of, for instance, 0.20 to 0.28 mm in thickness, the optimal processing conditions are set for thin cards of 0.20 to 0.28 mm in thickness. More specifically, the pinching forces of the pinch rollers opposite the drive rollers on the passage, that of the magnetic head pinch roller opposite the magnetic head in the data recording/reproducing unit and those of the thermal head and the erasing head are set.

If it is tried to process a 0.68 to 0.84 mm thick card with this card reader optimally set for thinner cards of 0.20 to 0.28 mm in thickness, it is very likely for some trouble to arise in the card reader such as a fault in carriage, printing, erasion, recording or reproduction. This would be due to the difference not only in the thickness of the card but also in the flexibility or the like of the card.

Thus, the setting of the pinching force in carriage, printing, erasion and data recording/reproduction cannot be equal for a 0.68 to 0.84 mm thick card and a thinner card of 0.20 to 0.28 mm in thickness, and fine adjustment for the differences is not easy with any conventional card reader. In particular, a 0.68 to 0.84 mm thick card is less flexible than a thinner card of 0.20 to 0.28 mm in thickness. This means that if the thicker card is warped or otherwise deformed, it is more likely than the flexible thinner card to invite some trouble in the card reader such as a fault in carriage, printing, erasion, recording or reproduction. Since it is not easy to adjust the pinching force in a card reader of any conventional configuration, satisfactory carriage, printing, erasion and so forth would be impossible.

Because of this problem, if a conventional card reader is designed for cards of a specific thickness, a different kind of card reader needs to be used for handling cards of another thickness. Or if the card reader is adaptable by altering the setting, it will be troublesome, and moreover not easy as mentioned above, to alter the setting every time a card of a different thickness is to be used, resulting in virtual impossibility to handle cards of different thicknesses with a single card reader. Anyhow, as many different types of card readers have to be made ready as the types of cards.

In addition to these, there further is the following problem.

The printable area of a thermally reversible material or the like formed on the card varies with the use of the card. In the card reader of the above-described configuration the widths and positions of the printing head and the erasing head are fixed, resulting in a lack of freedom. As the erasing head is linked to the thermal head, their replacement with heads of different widths would require disassembling into small parts, and has to be followed by accurate balancing between the two heads. Especially if a narrower head than the card is fitted, the pinching force the card receives from the head will not be uniform, making it impossible to subject the card to printing or erasion in a satisfactory state.

Moreover, such a card reader is not adequately compatible with cards having embossed signs, allowing no satisfactory printing, erasion, carriage or the like. Particularly if the pinching force on the card is too strong, the printing head and the erasing head may shave off the embossed parts and be damaged by doing so. Conversely, if the pinching force on the card is too weak, printing and/or erasion trouble may occur.

Further in order to achieve compatibility with IC cards used in electronic transactions in recent years, another IC card reader is required with the consequence that not only a large installation space is required but also the exchange of information would require connection of the two card readers, which would complicate the system.

In such a card reader according to the prior art, rollers for correcting any warp of the card would have to pinch the card with a very strong force in order to achieve sufficient correction to obtain satisfactory print quality. However, if the pinching forces of the rollers for straightening the card are strong, there will arise problems when no printing is done on the card, such as failure to properly record and/or reproduce data with magnetic heads or to carry the card over the passage.

The present invention, attempted to solve the above-described problems with the prior art, is intended to provide a card reader compatible with many different kinds of cards and excelling in card carrying performance.

SUMMARY OF THE INVENTION

According to the present invention, there is provided a card reader including: a card passage; carrying means for moving a card within the passage; data recording/reproducing means for at least either recording data onto or reproducing data out of the card present in the passage; image forming means for forming a visible image on the card; and image erasing means for erasing any visible image formed on the card, and having a configuration of handling of cards differing in thickness.

BRIEF DESCRIPTION OF THE DRAWINGS

These and other features and advantages of the invention will become more apparent from the detailed description hereunder, when taken in conjunction with the accompanying drawings, wherein.

PREFERRED EMBODIMENTS OF THE INVENTION

An embodiment of the present invention will be described below.

Figure 1:
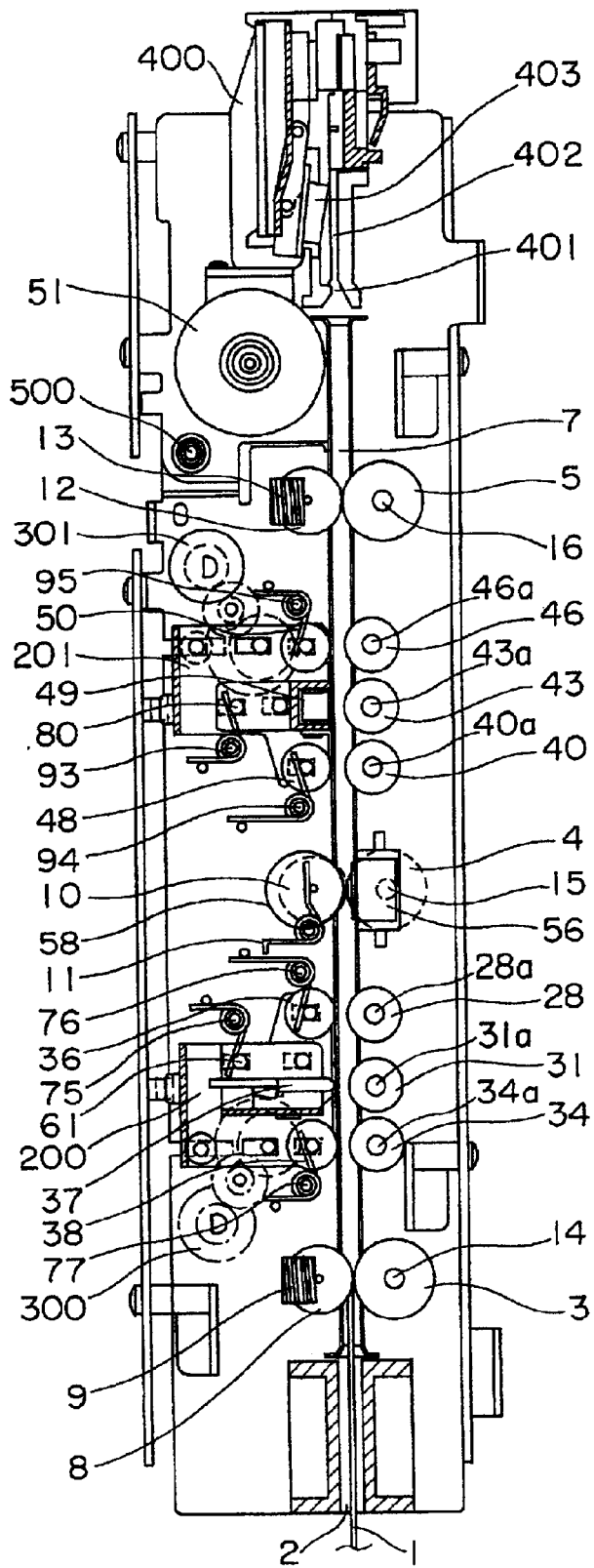
FIG. 1 is a sectional side view of a card reader in an embodiment of the present invention.

FIG. 1 is a sectional side view of a card reader in the embodiment of the present invention.

In FIG. 1, reference numeral 1 denotes a card. The card 1 has a memory section capable of at least either recording or reproducing data and a marking section permitting printing or erasion of characters or the like by using a thermally reversible material or the like. The memory section may be a magnetic stripe, an optical stripe, an IC or the like. The marking section may be a rewrite layer using a thermally reversible material, a liquid crystal layer or one of a write once type. Obviously, a card in the context of this specification is not limited to a card-shaped object, but a belt-shaped or a sheet-shaped object may as well be used suitably.

Reference numeral 2 denotes an inlet for inserting the card 1; and 7, a passage for carrying the card 1. The passage 7 is composed of at least one guide assembly or the like. More specifically, it is preferable for ensuring stable carriage of the card to have the card 1 carried while its two flanks are guided by two guides 6, including a fixed guide and a movable guide.

Reference numeral 3 denotes a drive roller fitted to a rotation shaft 14. A follower roller 8 is positioned opposite the drive roller 3. The follower roller 8 is energized toward the passage 7 by an elastic member 9, which may be a coil spring or the like. To this drive roller 3 is transmitted a driving force by drive means, to be described afterwards, via the rotation shaft 14. This drive roller 3 and the follower roller 8 pinch the card 1 between them to move the card 1 within the passage 7.

Reference numeral 200 denotes a printing unit disposed to be able to protrude into or recede from the passage 7. The printing unit 200 is provided with a printing section 37 and corrective rollers 36 and 38. Driving rollers 31, 28 and 34 are positioned opposite the printing section 37 and the corrective rollers 36 and 38, respectively. The printing unit 200 is driven by the drive means to be described later. When prescribed characters or the like are to be printed on the card 1, the printing unit 200 protrudes into the passage 7, and the card 1 is pinched between the corrective rollers 36 and 38 and the rollers 28 and 34 opposite them for the correction of any bend or the like of the card 1 (if it is warped, the warp will be straightened) before the printing section 37 prints on the card 1, resulting in satisfactory print quality.

Where no character is prescribed for printing on the card 1, the printing unit 200 recedes from the passage 7, and the card 1 is pinched neither between the corrective rollers 36 and 38 and the rollers 28 and 34 nor between the printing section 37 and the roller 31, resulting in smooth carriage of the card 1. As the printing section 37, a thermal head or an ink jet head can be suitably used; a thermal head where a rewrite layer is used as the marking section of the card 1 is suitable or either a thermal head or an ink jet head where a write once type one is used as the marking section of the card 1 is suitable. For straightening a bend or warp of the card, the use of the corrective rollers 36 and 38 and the rollers 28 and 34 was referred to, but it is also possible to correct a bend or the like of the card 1 with, for instance, a flat plate that can protrude into or recede from the passage 7.

Reference numeral 75 denotes an elastic part for energizing the printing section 37 toward the passage 7. As the elastic part 75, a coil spring, for instance, can be suitably used. The elastic part 75 applies a force directly to a shaft 61 provided in the printing section 37.

Reference numerals 76 and 77 denote elastic parts for applying loads onto the corrective rollers 36 and 38, respectively. As the elastic parts 76 and 77, coil springs or the like can be suitably used. As it is thus possible to apply pinching forces with the elastic parts 75, 76 and 77 individually to the printing section 37 and the corrective rollers 36 and 38, the pinching forces applied from the corrective rollers 36 and 38 to the card 1 can be made extremely great by appropriately varying the pinching forces of the different elastic parts, and moreover the pinching force applied from the printing section 37 to the card 1 can be minimized. Since this configuration allows reliable correction of any warp or the like of the card 1 by applying large pinching forces from the corrective rollers 36 and 38 to the card 1 and moreover optimization of the contact pressure of the printing section 37 on the card 1, the wear of the printing section 37 (especially where a thermal head is used) can be reduced, resulting in stable print quality and an extended useful life of the printing section 37.

The pinching loads of the corrective rollers 36 and 38 then should preferably be set between 3 N and 50 N. If the loads are less than 3 N, there will be little effect to correct any bend or the like of the card 1. If they are more than 50 N, the card 1 may be more likely worn or broken.

The pinching load of the printing section 37 should preferably be set to not less than 3 N. If the pinching load is less than 3 N and the card 1 is deformed, it is more likely to invite faulty printing. If it is set to 6 N or above, satisfactory printing can be made possible against any possible deformation within the range of practical use of the card 1. It is further preferable to set the pinching load of the printing section 37 to 50 N or less. If it is more than 50 N, it will be more likely for the card 1 to be worn or broken, or the printing section 37 to be seriously worn.

Further, it is preferable for the distances L between the contact part of the printing section 37 with the card 1 and the rotation centers of the corrective rollers 36 and 38 should preferably be between 8 mm and 40 mm (more preferably between 11 mm and 16 mm). If the distances L are not more than 8 mm, the resultant smaller diameters of the corrective rollers 36 and 38 will make extremely difficult the choice of their material and their assembling ease will be adversely affected. If the distances L are not less than 40 mm, even though the pinching forces of the corrective rollers 36 and 38 are applied to the card 1 and any bend or the like of the card 1 is corrected, the excessively long distances between the corrective rollers 36 and 38 and the printing section 37 will weaken the straightening effect on the card 1, resulting in little possibility of improving the quality of printing or the like.

Although in this embodiment the corrective rollers 36 and 38 are provided on the printing unit 200 and enabled to protrude into or recede from the passage 7 together with the printing section 37 for the sake of convenience and structural simplicity among other reasons, the corrective rollers 36 and 38 may as well be provided separately and enabled to independently protrude into or recede from the passage 7 instead of being integrated with the printing unit 200. This configuration, though involving a somewhat more complex structure, would make possible higher print quality and smoother movement of the card 1 in the passage 7.

Furthermore, although two corrective rollers, including the corrective rollers 36 and 38, are used in this embodiment, use of at least one corrective roller could provide a sufficient corrective effect. For instance, a configuration in which no corrective roller 38 but only the corrective roller 36 is provided is conceivable. To add, if the number of corrective rollers is increased, the corrective effect will be enhanced, but it is preferable to limit the number of corrective rollers 38 to at most four with a view to reducing the hardware size among other factors.

Reference numeral 56 denotes a data recording/reproducing unit for at least either recording data onto or reproducing data out of the card 1. In this embodiment, a magnetic head is used as the data recording/reproducing unit 56. The configuration is such that, where a magnetic head is used as this data recording/reproducing unit 56, a magnetic stripe is provided on the card 1. Acceptable alternatives to a magnetic head for use as the data recording/reproducing unit 56 include an optical head for at least either recording or reproducing data (in this case an optical stripe or a bar code is provided on the card 1).

Reference numeral 58 denotes a pinch roller opposite the data recording/reproducing unit 56 (a magnetic head in this embodiment). The pinch roller 58 is not fixed, but has elasticity toward the data recording/reproducing unit 56. The data recording/reproducing unit 56 is urged by an elastic part 57 toward the pinch roller 58.

Therefore, the configuration is such that the card 1 be securely pinched between the data recording/reproducing unit 56 and the pinch roller 58 to make possible at least either recording or reproduction of data. As the elastic part 57, a coil spring or the like can be suitably used.

Figure 16:
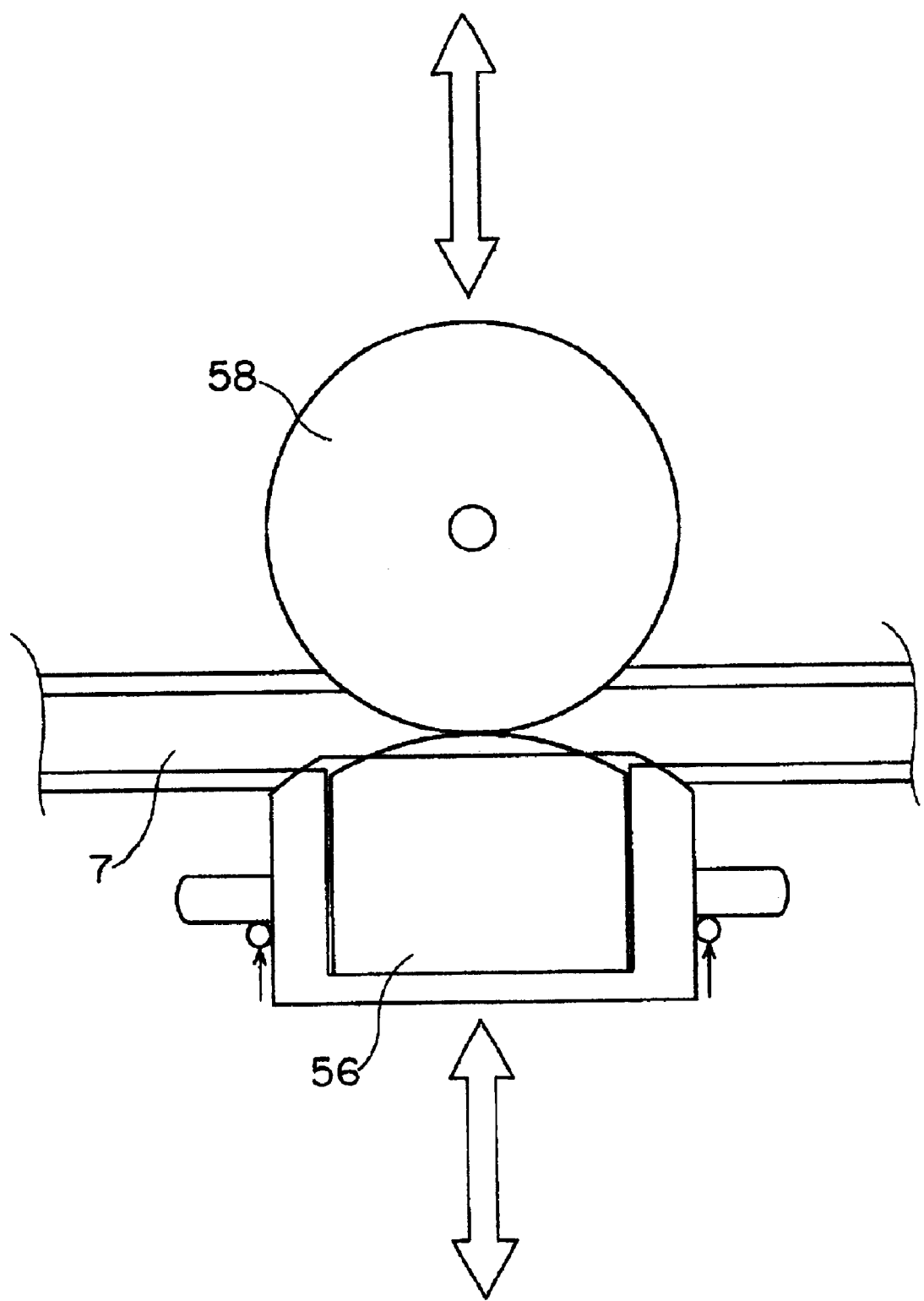
FIG. 16 is an enlarged view of the data recording/reproducing unit of the card reader in the embodiment of the present invention.

FIG. 16 is an enlarged view of the data recording/reproducing unit of the card reader in the embodiment of the present invention. As shown in FIG. 16, both the data recording/reproducing unit 56 and the pinch roller 58 are energized toward the passage 7.

Figure 17:
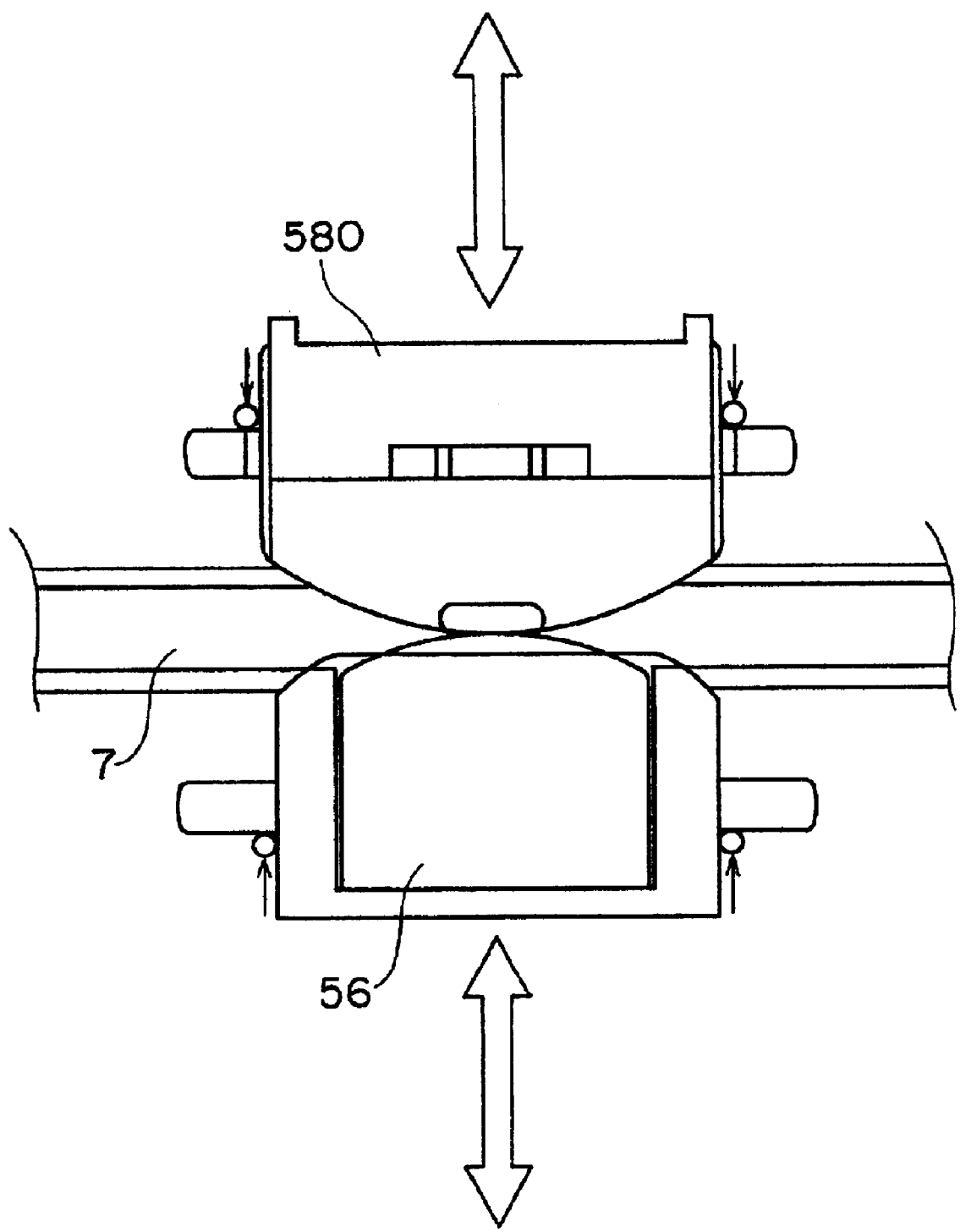
FIG. 17 is an enlarged view of another example of data recording/reproducing unit for the card reader in the embodiment of the present invention.
Figure 18:
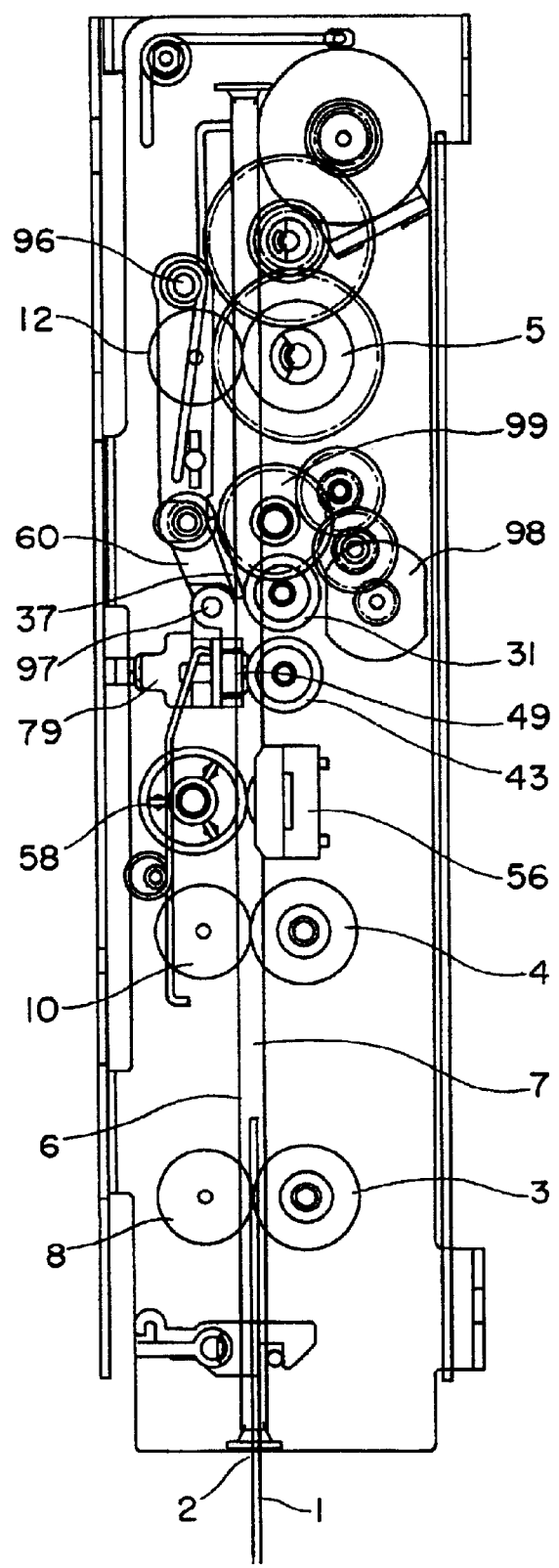
FIG. 18 is a sectional side view of a conventional card reader.

Incidentally, a pad may be provided in place of the pinch roller 58. FIG. 17 is an enlarged view of another example of data recording/reproducing unit for the card reader in the embodiment of the invention. In FIG. 17, reference numeral 580 denotes a pad. The pad 580, like the pinch roller 58, has elasticity toward the data recording/reproducing unit 56, and the configuration is such that the card 1 be securely pinched between the data recording/reproducing unit 56 and the pad 580 to make possible at least either recording or reproduction of data.

Since the data recording/reproducing unit 56 and the pinch roller 58 (or the pad 580) opposite it securely pinch the card 1 between them and the pinch roller 58 (or the pad 580) has elasticity, adaptation to variations in the thickness of the card 1 is made possible.

Reference numeral 4 denotes a drive roller provided on a rotation shaft 15, and a follower roller 10 is positioned opposite the drive roller 4. The follower roller 10 is urged by an elastic member 11, such as a coil spring, toward the passage 7. To this drive roller 4, driving force is transmitted by the drive means to be described afterwards via the rotation shaft 15. These drive roller 4 and follower roller 10 pinch the card 1 between them to move the card 1 in the passage 7.

Reference numeral 201 denotes an erasing unit provided to be able to protrude into or recede from the passage 7. The erasing unit 201 is provided where reversible marking means is used as the marking section of the card 1. Thus, where printing is done by the printing unit 200 on the card 1 and the print is to be erased later, this erasing unit 201 is used. For instance, where a thermally reversible rewrite layer is used as the marking section of the card 1, heating means for heating the mark on the card 1 to a prescribed temperature is used as the erasing unit 201. Incidentally, if there is no need to write characters onto the card 1 and to later erase the characters, this erasing unit is not required.

The erasing unit 201 is provided with an erasing section 49 and corrective rollers 48 and 50. Rollers 43, 40 and 46 to drive the erasing section 49 and the corrective rollers 48 and 50, respectively, are disposed opposite them. The rollers 43, 40 and 46 are provided with rotation shafts 43a, 40a and 46a, respectively. The erasing unit 201 is driven by the drive means to be described later and, when prescribed characters or the like visually formed on the card 1 are to be erased, the erasing unit 201 protrudes into the passage 7. The card 1 is pinched between the corrective rollers 48 and 50 and the rollers 40 and 46 opposite them to be cleared of any bend (or of a warp, if any) of the card 1, and the erasing section 49 erases any image or the like formed on the card 1, resulting in high erasion quality.

If no prescribed character on the card 1 is to be erased, the erasing unit 201 recedes from the passage 7 and the card 1 is not pinched either between the corrective rollers 48 and 50 and the rollers 40 and 46 or between the erasing section 49 and the roller 43, resulting in smooth carriage of the card 1. As the erasing section 49, a heating resistor (a heater or the like having a configuration in which a heating element is provided over a substrate and a protective film of glass, silica or the like covers the heating element) can be suitably used. As the means for correcting any bend or warp of the card 1, the corrective rollers 48 and 50 and the rollers 40 and 46 are used in the above-described configuration, but it is also possible to correct a bend or the like of the card 1 with, for instance, a flat plate that can protrude into or recede from the passage 7.

Reference numeral 93 denotes an elastic part for energizing the erasing section 49 toward the passage 7. As the elastic part 93, a coil spring, for instance, can be suitably used. The elastic part 93 applies a force directly to a shaft 80 provided in the erasing section 49.

Reference numerals 94 and 95 denote elastic parts applying loads on the corrective rollers 48 and 50, respectively. As the elastic parts 94 and 95, coil springs or the like can be suitably used. As it is thus possible to apply pinching forces with the elastic parts 93, 94 and 95 individually to the erasing section 49 and the corrective rollers 48 and 50, the pinching forces applied from the corrective rollers 48 and 50 to the card 1 can be made extremely great by appropriately varying the pinching forces of the different elastic parts, and moreover to minimize the pinching force applied from the erasing section 49 to the card 1. Since this configuration allows reliable correction of any bend or the like of the card 1 by applying large pinching forces from the corrective rollers 48 and 50 to the card 1 and moreover optimization of the contact pressure of the erasing section 49 on the card 1, the wear of the erasing section 49 (especially where a thermal resistor is used) can be reduced, resulting in stable erasing performance and an extended useful life of the erasing section 49.

The pinching loads of the corrective rollers 48 and 50 then should preferably be set between 3 N and 50 N. If the loads are less than 3 N, there will be little effect to correct any bend or the like of the card 1. If they are more than 50 N, the card 1 may be more likely worn or broken.

The pinching load of the erasing section 49 should preferably be set to not less than 3 N. If the pinching load is less than 3 N and the card 1 is deformed, it is more likely to invite faulty erasion. If it is set to 6 N or above, satisfactory erasion can be accomplished even if the sensitivity of the thermally reversible material or the like of the card 1 is low. Further by setting the load to 13 N or above, it is made possible to achieve satisfactory erasion against any possible deformation within the range of practical use of the card 1. It is further preferable to set the pinching load of the erasing section 49 to 50 N or less. If it is more than 50 N, it will be more likely for the card 1 to be worn or broken, or the erasing section 49 to be seriously worn.

Further, it is preferable for the distances M between the contact part of the erasing section 49 with the card 1 and the rotation centers of the corrective rollers 48 and 50 should preferably be between 8 mm and 40 mm (more preferably between 11 mm and 16 mm). If the distances M are not more than 8 mm, the resultant smaller diameters of the corrective rollers 48 and 50 will make extremely difficult the choice of their material and adversely affect their assembling ease. If the distances M are not less than 40 mm, even though the pinching forces of the corrective rollers 48 and 50 are applied to the card 1 and any bend or the like of the card 1 is corrected, the excessively long distances between the corrective rollers 48 and 50 and the erasing section 49 will weaken the straightening effect on the card 1, resulting in little possibility of improving the erasing performance or the like.

Although in this embodiment the corrective rollers 48 and 50 are provided on the erasing unit 201 and enabled to protrude into or recede from the passage 7 together with the erasing section 49 for the sake of convenience and structural simplicity among other reasons, the corrective rollers 48 and 50 may as well be provided separately and enabled to independently protrude into or recede from the passage 7 instead of being integrated with the erasing unit 201. This configuration, though involving a somewhat more complex structure, would make possible higher erasion quality and smoother movement of the card 1 in the passage 7.

Furthermore, although two corrective rollers, including the corrective rollers 48 and 50, are used in this embodiment, use of at least one corrective roller could provide a sufficient corrective effect. For instance, a configuration in which no corrective roller 50 but only the corrective roller 48 is provided is conceivable. To add, if the number of corrective rollers 48 is increased, the corrective effect will be enhanced, but it is preferable to limit the number of corrective rollers 48 to at most four with a view to reducing the hardware size among other factors.

Reference numeral 5 denotes a drive roller fitted to a rotation shaft 16. A follower roller 12 is positioned opposite the drive roller 5. The follower roller 12 is energized toward the passage 7 by an elastic member 13 such as a coil spring. To this drive roller 5, driving force is transmitted by the drive means to be described afterwards via the rotation shaft 16. This drive roller 5 and the follower roller 12 pinch the card 1 between them to move the card 1 within the passage 7.

Reference numeral 51 denotes a drive unit for driving the drive rollers. As the drive unit 51, a motor or the like can be suitably used.

Reference numeral 400 denotes an IC read unit. Reference numeral 401 denotes a card inlet, through which the card 1 having moved within the passage 7, pinched between the drive roller 5 and the follower roller 12, is inserted into the IC read unit 400. Reference numeral 402 denotes a passage for the card 1. Further, reference numeral 403 denotes an IC contact part. In a so-called contact type IC card, wherein the card 1 is mounted with an IC inside and has on its surface an electrode connected to an IC, the IC contact part 403 has at least one electrode in contact with the electrode provided on the surface of the card 1.

Where the card 1 is a so-called non-contact type IC card having within it an antenna (coil and capacitor) capable of wireless exchanging of data with an IC, the configuration will have a coil-shaped antenna or a member to generate a capacitance in place of the IC contact part 403.

Figure 2:
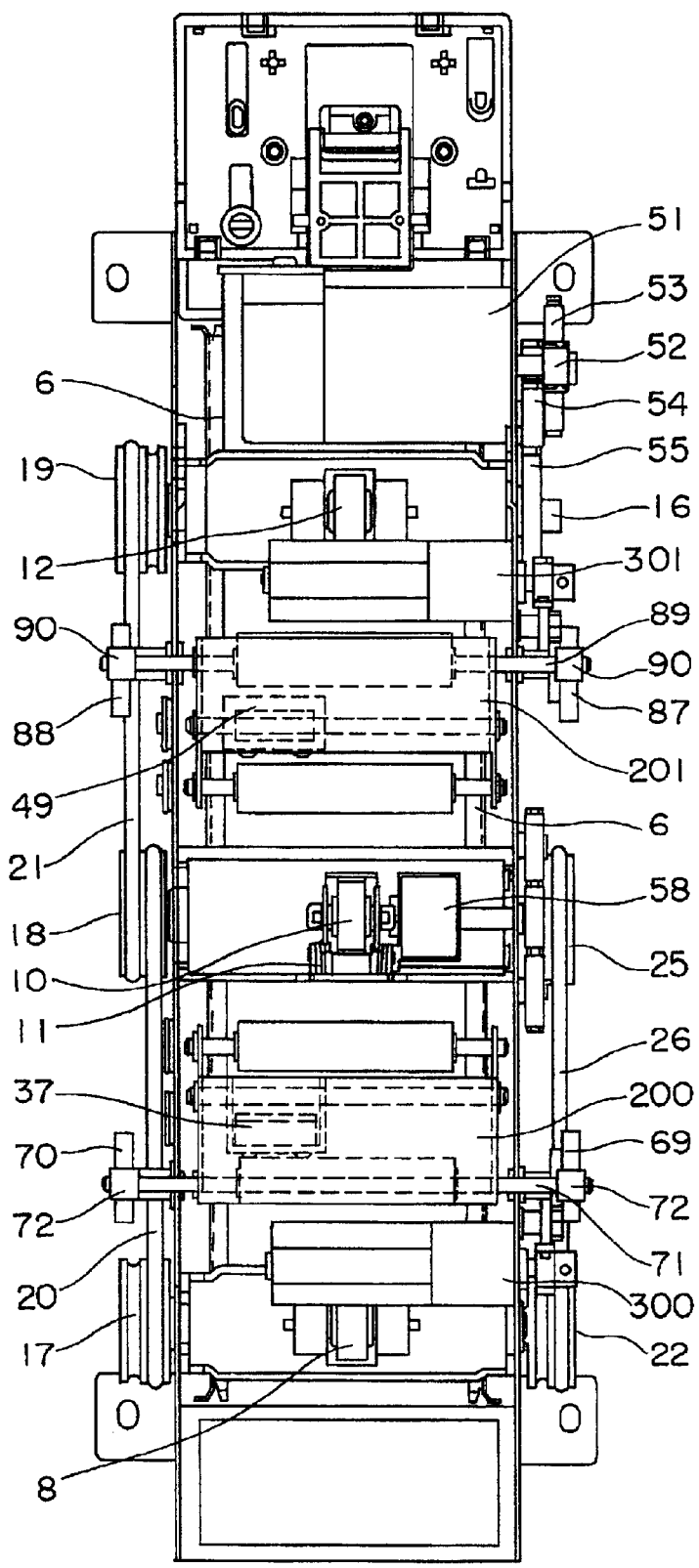
FIG. 2 is a top plan view of the card reader in the embodiment of the present invention as viewed from above.

FIG. 2 is a top plan view of the card reader in one embodiment of the present invention as viewed from above. In FIG. 2, reference numeral 300 denotes a drive unit for lifting and lowering the printing unit 200. As the drive unit 300, a motor or the like is used. Reference numeral 301 denotes a drive unit for lifting and lowering the erasing unit 201. As the drive unit 301, a motor or the like is used.

Figure 3:
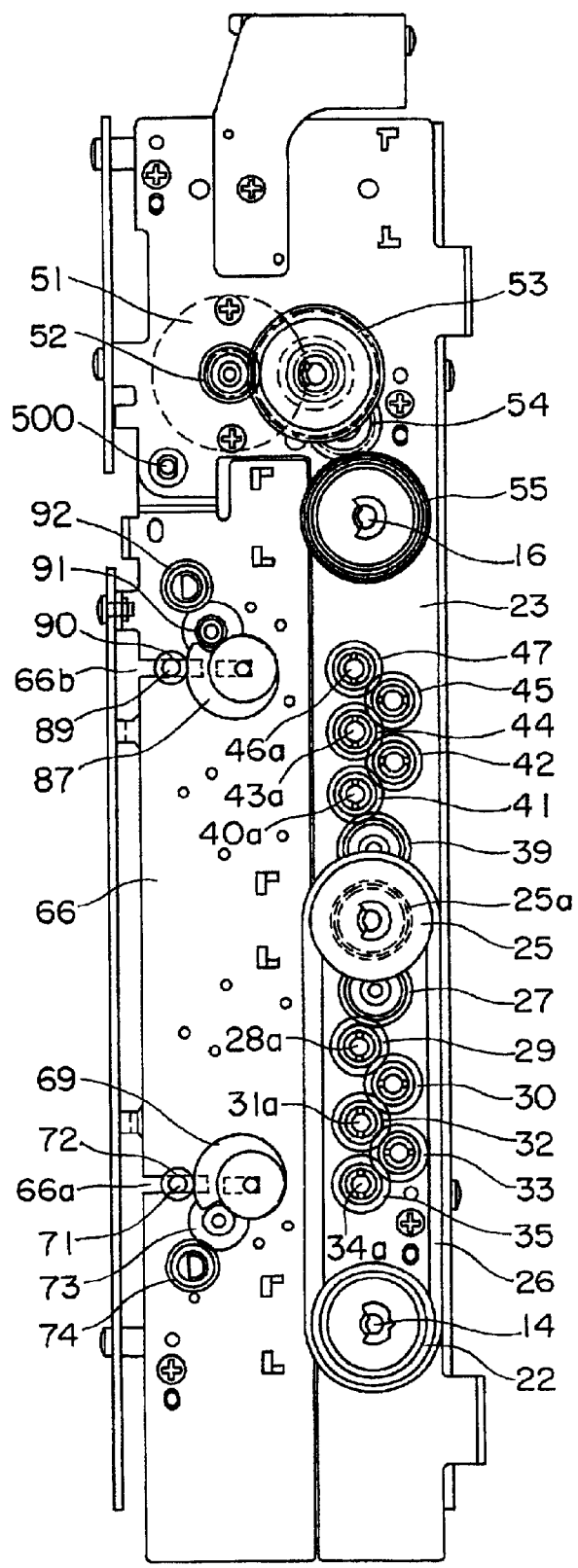
FIG. 3 is a side elevation view of the card reader in the embodiment of the present invention.
Figure 4:
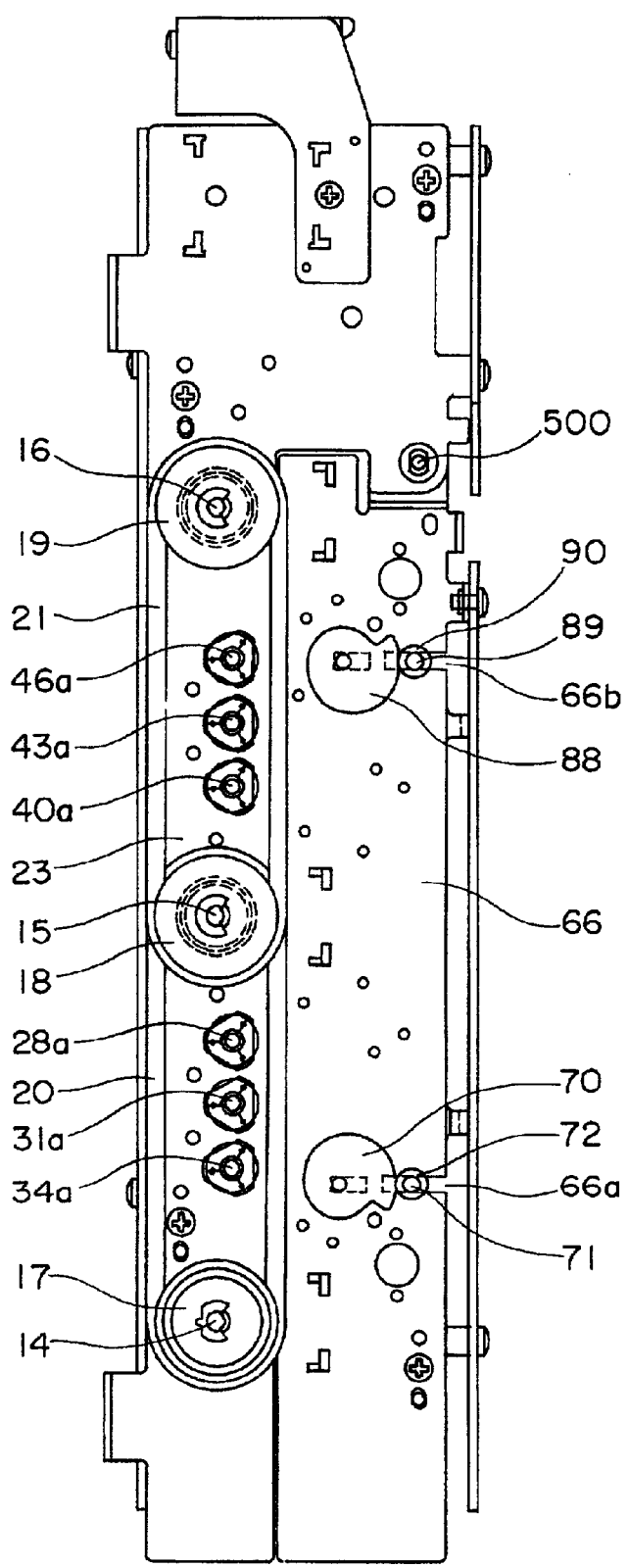
FIG. 4 is a side elevation view of the card reader in the embodiment of the present invention.

In this embodiment, as shown in FIG. 3, the division of the card reader into a chassis 66 and a chassis 23 and their rotatable fitting make it possible, in the event that the card 1 gets stuck within the passage 7 or internal maintenance so requires, to expose the passage 7 by, for instance, turning the chassis 66 around a rotation shaft 500. By arranging in this configuration the drive unit 51 on the chassis 23 which is on the installation side and arranging the drive units 300 and 301 on the chassis 66, the whole structure can be well balanced in weight, and the exposure of the passage 7 and other actions are thereby facilitated.

Further by constructing the passage 7 of a fixed guide and a movable guide, it is made possible to carry the card 1 with its two flanks guided by the two guides 6 including the fixed guide and the movable guide.

For exposing a passage in such a structure, a commonly known configuration is for a chassis to be divided into upper and lower segments, which together constitute the passage. In such a configuration, while internal maintenance is facilitated, reassembling of the two chassis segments after separation may result in inaccurate meeting of rollers arranged on the segments. In such an event, the accuracy of card carriage along the passage formed between the two chassis segments may be seriously deteriorated, and the gap between the two segments should also be prevented from variation. To prevent axial and positional misalignments, hard and vibration-resistant members should be used, resulting in a problem of high cost and heavy weight of the card reader. However, constructing the passage 7 of a fixed guide and a movable guide makes it possible for the passage 7 to remain in at least one of the chassis 66 and the chassis 23, into which the card reader is divided, when the passage 7 is exposed by turning one of the chassis around the rotation shaft 500. This results in an appropriate state in which no axial misalignment of the passage arises and the positional relationships among the rollers, erasing unit, printing unit and data reproducing/recording unit can be adequately preserved.

Figure 14:
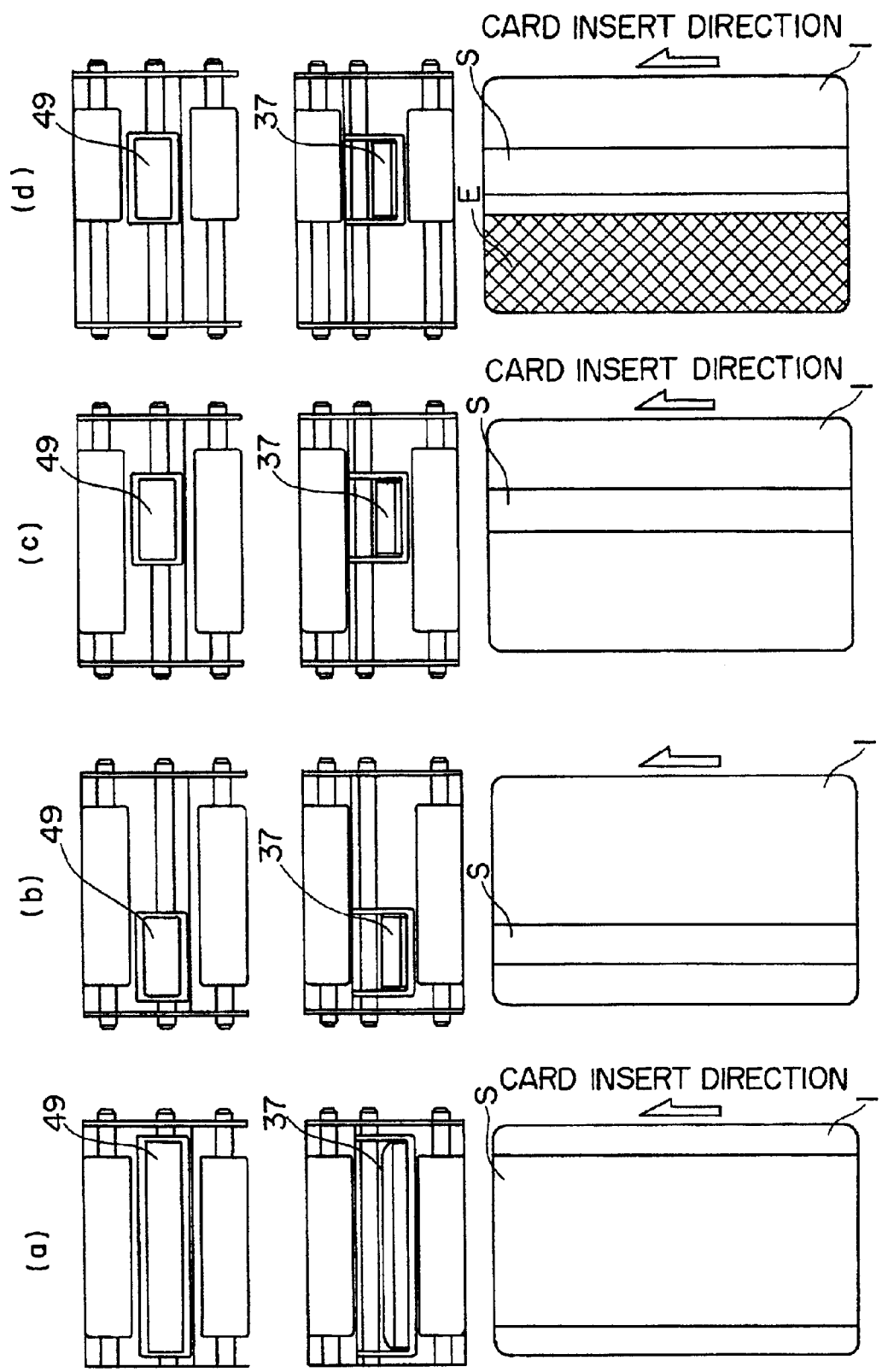
FIG. 14 consists of schematic diagrams of applications of the card reader in the embodiment of the present invention.

FIG. 14 consists of schematic diagrams of applications of the card reader in one embodiment of the present invention. As shown in FIG. 14, in the card reader according to the invention, the widths and/or the positions of the printing section 37 (thermal head) and the erasing section 49 (thermal resistor) are flexibly varied according to the type of the card. FIG. 14A shows a case in which there is used a card 1 having a marking section S consisting of a thermally reversible material formed substantially all over its surface, the width of the printing section 37 (thermal head) and the erasing section 49 (thermal resistor) being substantially equal to or greater than that of the card 1. In FIGS. 14B and 14C, the positions of the printing section 37 (thermal head) and of the erasing section 49 (thermal resistor) are matched with that of the marking section S of the card 1. Further, the card 1 shown in FIG. 14D has an embossed area E in addition to the marking section S. The card reader according to the invention can also adapt the widths and positions of the printing section 37 (thermal head) and of the erasing section 49 (thermal resistor) to such a card 1. Thus, the card reader according to the invention can flexibly adapt to cards of many different forms.

Figure 15:
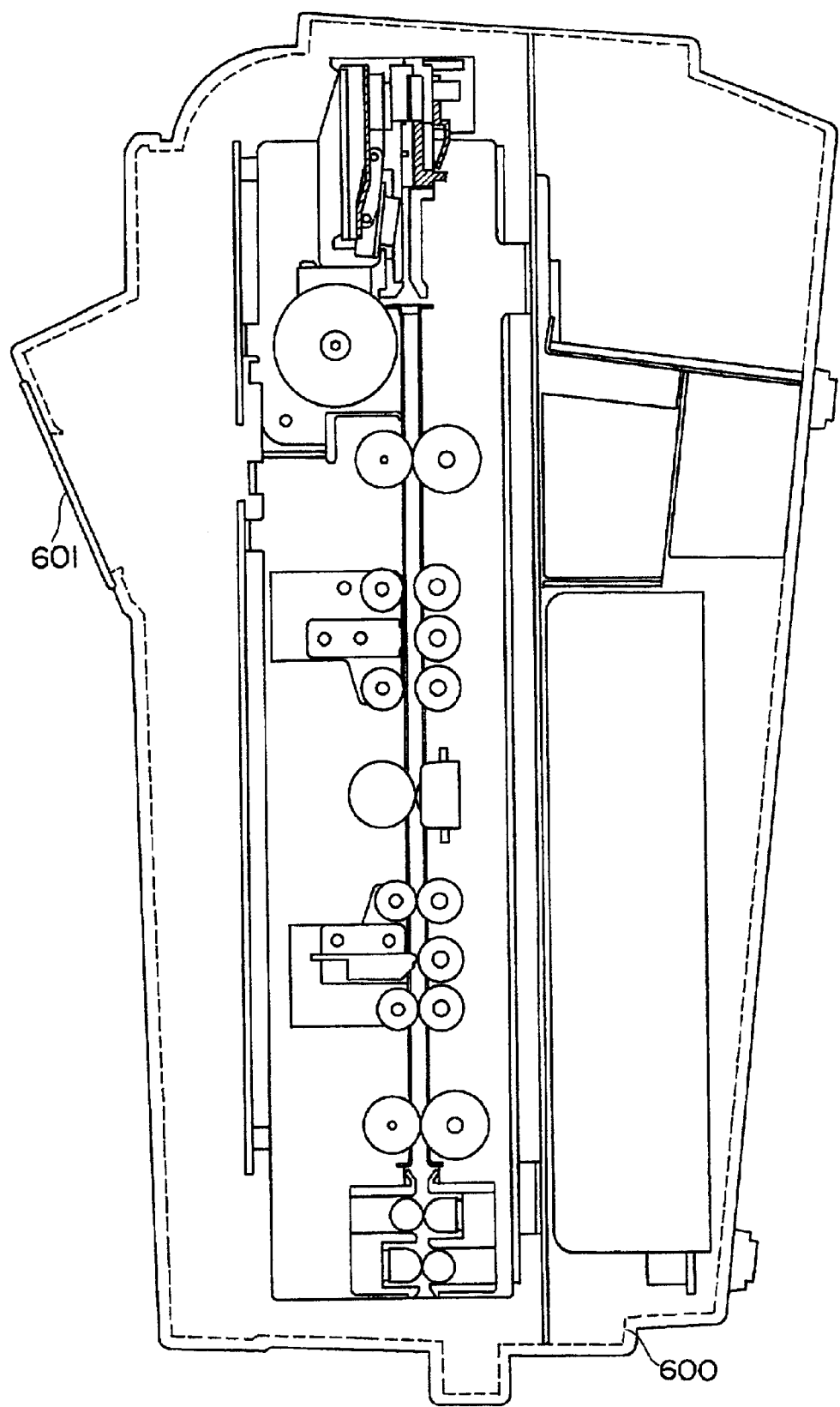
FIG. 15 is a sectional side view of an application of the card reader in the embodiment of the present invention.

FIG. 15 is a sectional side view of an application of the card reader in the embodiment of the present invention. The card reader is housed in a casing 600, and an operation panel 601 mounted with a ten-key assembly, function keys, a liquid crystal marking section or the like permits inputting to the card reader. The casing 600 can improve the aesthetic aspect of the external design and protect the card reader from the infiltration of dust and impacts by external forces. The operation panel 601 facilitates inputting to the card reader for card handling.

The operation of the card reader will be described below with reference to FIG. 1 through FIG. 13.

Figure 5:
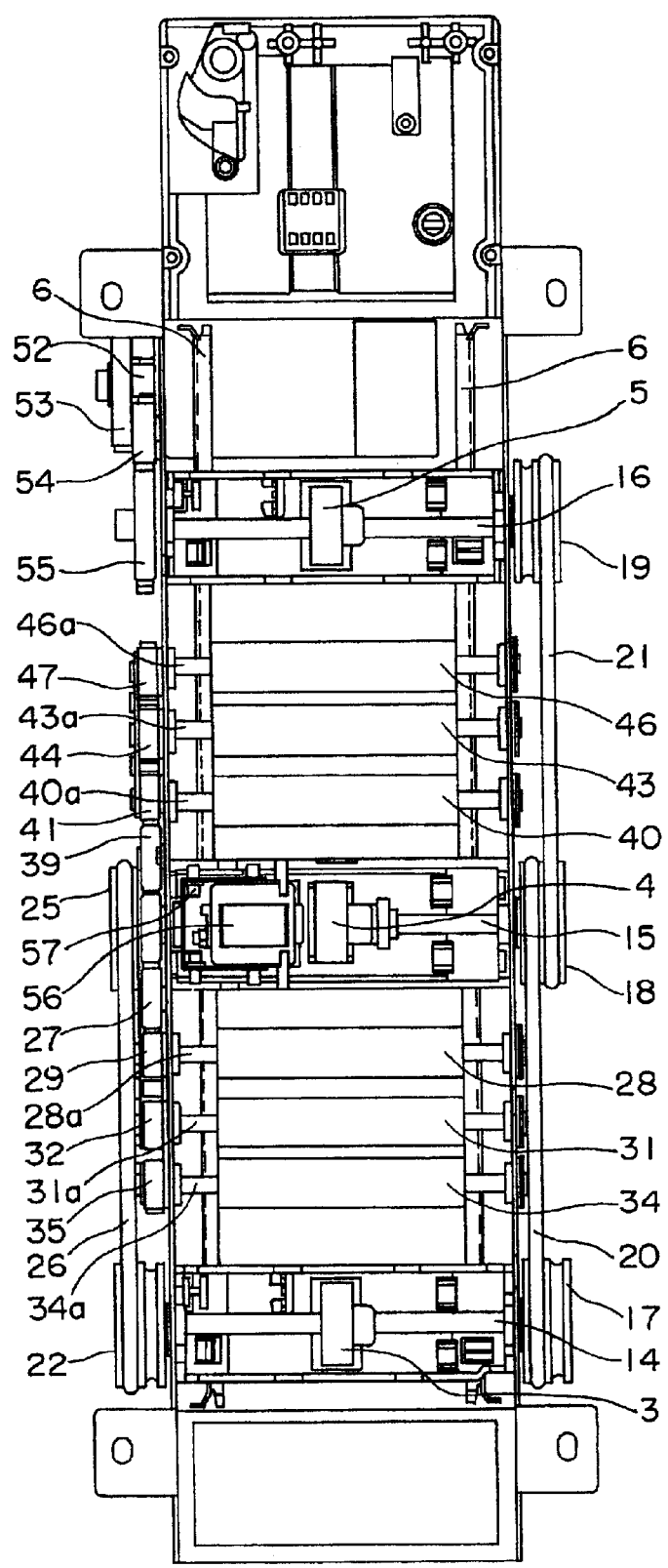
FIG. 5 is a bottom plan view of the card reader in the embodiment of the present invention as viewed from underneath.

First, when the drive unit 51 starts driving, a gear 52 provided on the drive unit 51 turns as shown in FIG. 3 and FIG. 5, and its driving force is transmitted to a gear 55 via gears 53 and 54. As the rotation shaft 16 is fixed to the gear 55, the rotation shaft 16 also turns with the rotation of the gear 55, resulting in the turning of the drive roller 5. On the other side of the rotation shaft 16 than where the gear 55 is provided, a pulley 19 is disposed, which turns with the rotation of the rotation shaft 16. A belt 21 is stretched between the pulley 19 and a pulley 18, so that the rotation of the pulley 19 is transmitted to the pulley 18 via the belt 21. The rotation shaft 15 is fitted to the pulley 18, so that the rotation shaft 15 is also turned by the rotation of the pulley 18, and so is the drive roller 4 provided on the rotation shaft 15. Further a belt 20 is stretched between the pulley 18 and a pulley 17 so that the rotation of the pulley 18 is transmitted to the pulley 17 via the belt 20. The rotation shaft 14 is fitted to the pulley 17, so that the rotation shaft 14 is also turned by the rotation of the pulley 17, and so is the drive roller 3 provided on the rotation shaft 14. On the other side of the rotation shaft 14 than where the pulley 17 is provided, a pulley 22 is disposed, which turns with the rotation of the rotation shaft 14. A belt 26 is stretched between the pulley 22 and a pulley 25, and therefore the pulley 25 is turned by the rotation of the pulley 22. Within the pulley 25 is integrally provided a gear 25a, so that the rotation of the pulley 25 is transmitted to a gear 41 via an idler 39 to turn a rotation shaft 40a, and the roller 40 fitted to the rotation shaft 40a turns along with that. The rotation of the gear 41 is further transmitted to a gear 44 via an idler 42 to turn a rotation shaft 43a. Along with that, the roller 43 fitted to the rotation shaft 43a turns, and the rotation of the gear 44 is further transmitted to a gear 47 via an idler 45 to turn a rotation shaft 46a, and the roller 46 fitted to the rotation shaft 46a turns along with that.

Via another route, the rotation of the pulley 25 is transmitted to a gear 29 via an idler 27 to turn a rotation shaft 28a. Along with that, the roller 28 fitted to the rotation shaft 28a turns, and the rotation of the gear 29 is transmitted to a gear 32 via an idler 30 to turn a rotation shaft 31a. Along with that, the roller 31 fitted to the rotation shaft 31a turns, and the rotation of the gear 32 is transmitted to a gear 35 via an idler 33 to turn a rotation shaft 34a. Along with that, the roller 34 fitted to the rotation shaft 34a turns.

Thus by running the drive unit 51, the drive rollers 3, 4 and 5 and the rollers 34, 31, 28, 40, 43 and 46 are rotationally driven, the card 1 is moved within the passage 7, prescribed characters are printed on or erased from the card 1, or at least either recording or reproduction of data is accomplished. Further by appropriately controlling the rotational direction of the drive unit 51, the card 1 can be moved either from the inlet 2 toward the drive unit 51 or in the other direction within the passage 7.

Next will be described the operations of the printing unit 200 and the erasing unit 201.

First, the printing unit 200 will be taken up.

Figure 8:
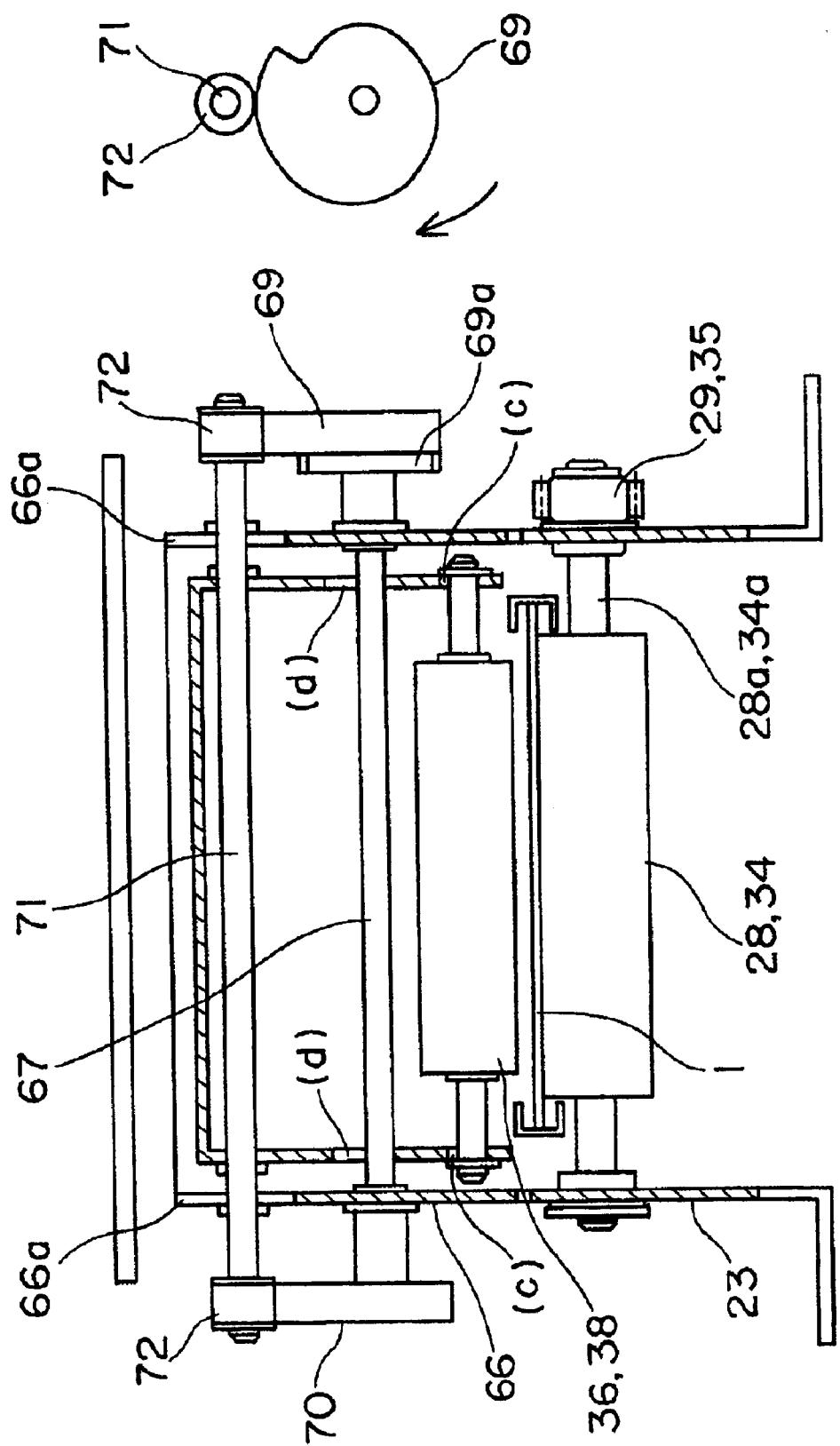
FIG. 8 is an enlarged view of the card reader in the embodiment of the present invention.

When the drive unit 300 shown in FIG. 1 starts running, a gear 74 fitted to the drive unit 300 turns, and its rotation is transmitted via an idler 73 to a gear 69a fitted to a cam 69. Then, since the cam 69 is fitted to a rotation shaft 67 and a cam 70 is further fitted to the rotation shaft 67 as shown in FIG. 8, the rotation of the drive unit 300 causes the cams 69 and 70 to turn. The rotation shaft 67 is rotatably fitted to the chassis 66.

As illustrated in FIGS. 6 through 9, the cams 69 and 70 are so shaped that the distances from the rotation shaft 67 to their circumferences be not uniform, and preferably each circumference should have a step as shown in FIGS. 6 through 9. The configuration is such that, with the rotation of the cams 69 and 70, a shaft 71 moves up and down in relation to the passage 7. The cams 69 and 70 and the shaft 71 are interlocked by cam followers 72 provided at both ends of the shaft 71. The cam followers 72 should preferably be fitted rotatably to the shaft 71 so as to reduce frictions of the cams 69 and 70 with the shaft 71.

Figure 6:
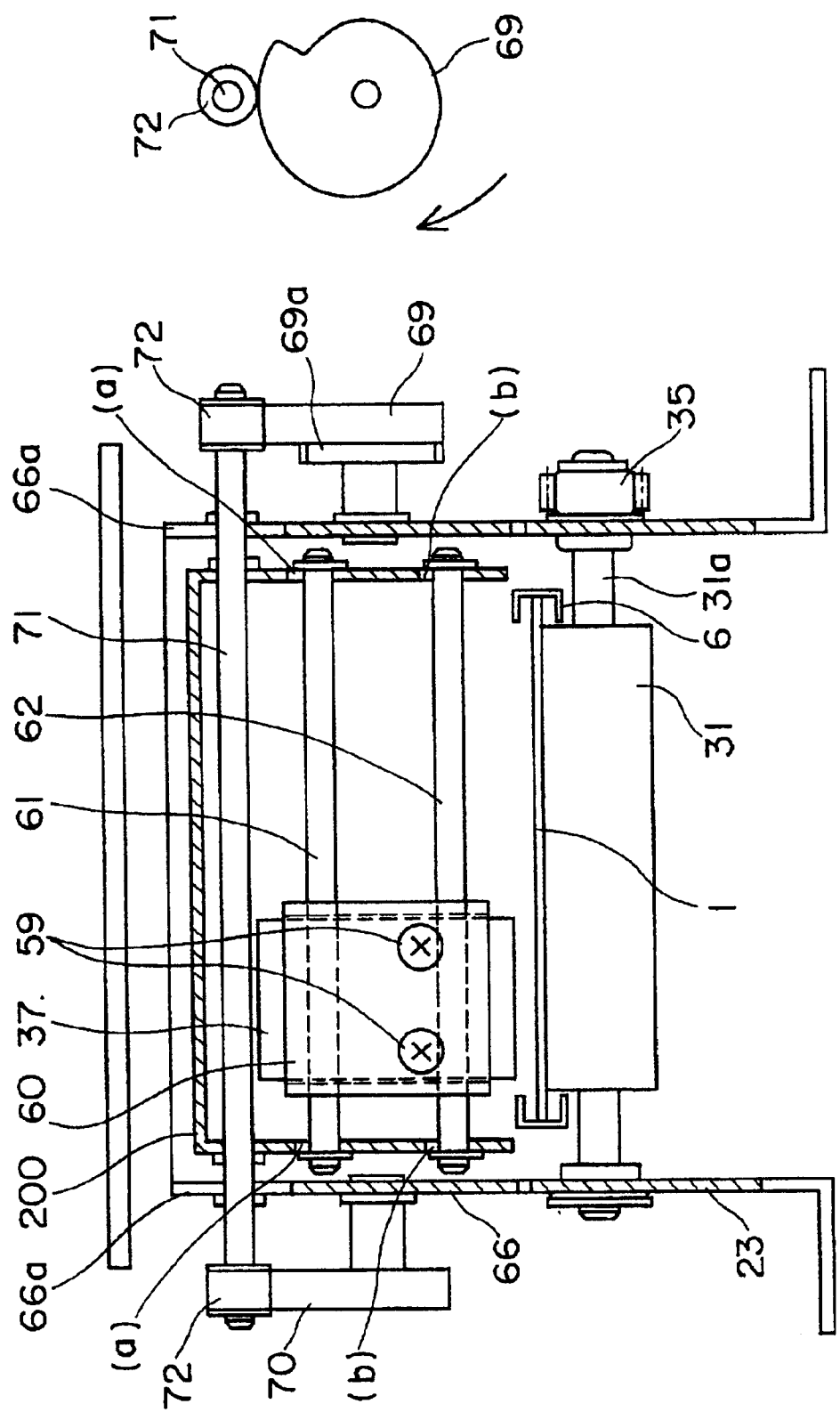
FIG. 6 is an enlarged view of the card reader in the embodiment of the present invention.

As shown in FIG. 6, the shaft 71 is fixed to the printing unit 200 and moreover is inserted into a long hole 66a provided in the chassis 66, and therefore the shaft 71 is held vertically movable relative to the chassis 66. Accordingly, with the ups and downs of the shaft 71, the printing unit 200 also moves vertically, and at least the printing section 37 can protrude into or recede from the passage 7. Also, the printing unit 200 is provided with two pairs of long holes (a) and (b), and shafts 61 and 62 are movably fitted to these long holes (a) and (b). To add, as described above, the shaft 61 is energized by the elastic part 75 toward the passage 7. In this arrangement, the printing section 37 is fitted to the shafts 61 and 62 via a holder 60.

Further, as shown in FIG. 8, the printing unit 200 is provided with a long hole (d), into which the rotation shaft 67 is inserted. This arrangement is intended to prevent the rotation shaft 67 provided in the chassis 66 from obstructing the vertical movements of the printing unit 200.

Also, as illustrated in FIG. 8, the printing unit 200 is provided with two long holes (c), which movably hold shafts 64 and 65, respectively. The shafts 64 and 65 are respectively provided with the corrective rollers 36 and 38, and the shafts 64 and 65 are energized by the elastic parts 76 and 77 toward the passage 7.

The operation of the printing unit 200 configured as described above will now be explained.

First, at least when no printing or the like is to be done on the card 1 by the printing unit 200, as shown in FIG. 6 and FIG. 8, the cam followers 72 are in contact with farther parts of the circumferences of the cams 69 and 70 from the rotation shaft 67, and in this state the shaft 71 is thrust upward, entailing the arrangement of the printing unit 200 away from the passage 7.

Figure 7:
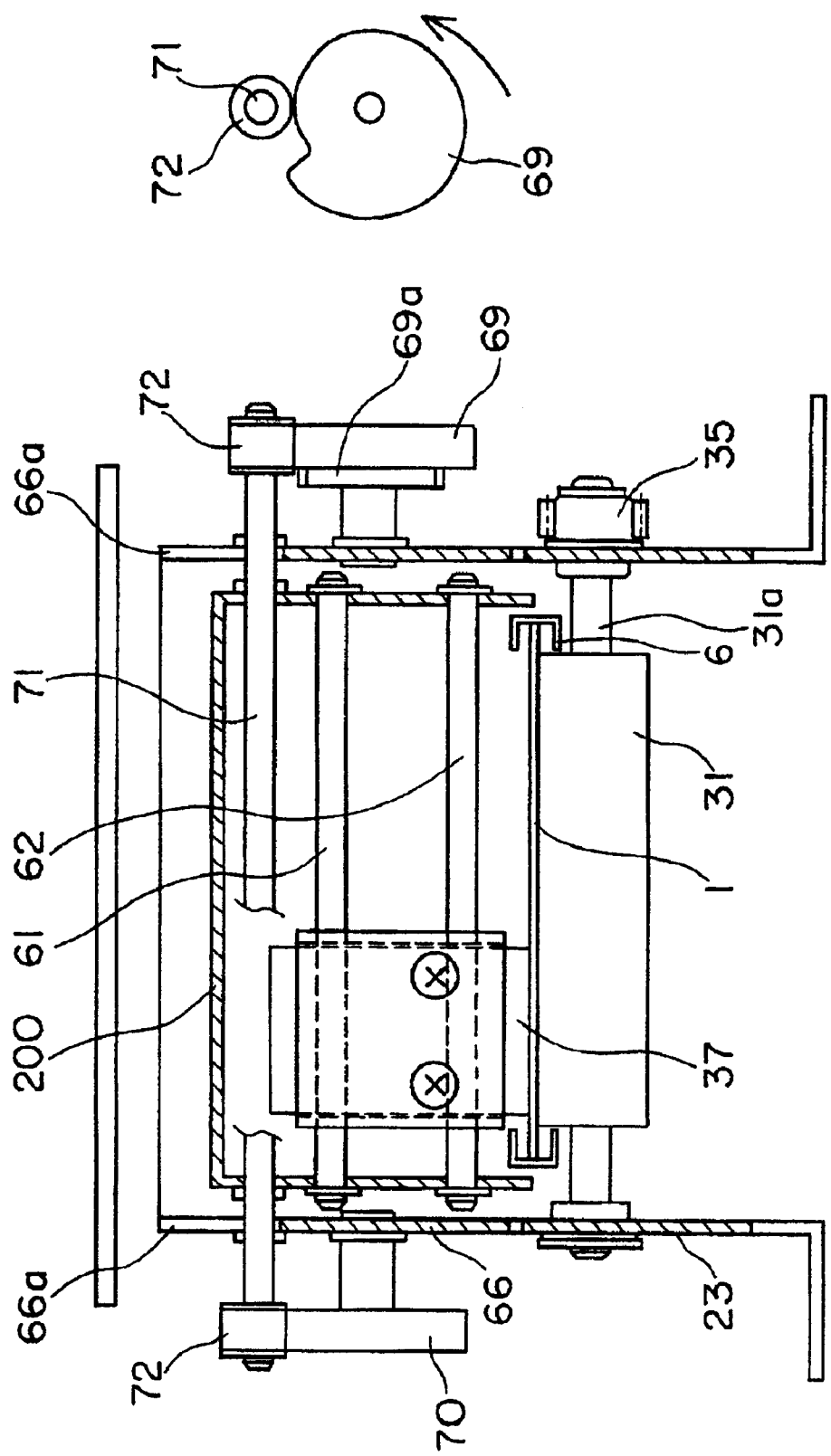
FIG. 7 is an enlarged view of the card reader in the embodiment of the present invention.
Figure 9:
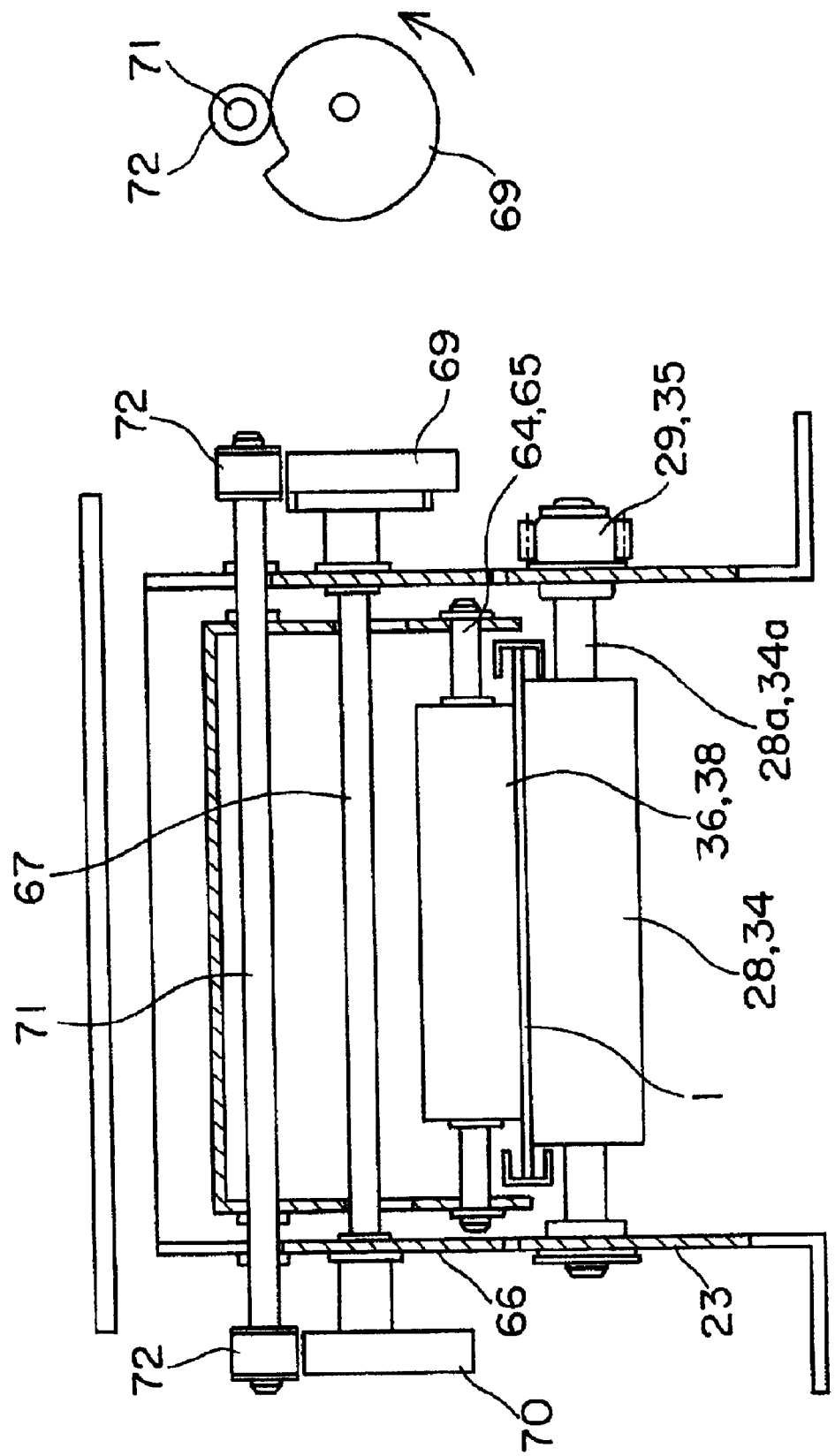
FIG. 9 is an enlarged view of the card reader in the embodiment of the present invention.

At least when printing or the like is to be done on the card 1, upon receipt of a printing instruction from a control section (not shown), the drive unit 300 turns in the direction of the arrows in FIG. 6 and FIG. 8, and along with that the cam followers 72 are in contact with closer parts of the circumferences of the cams 69 and 70 to the rotation shaft 67 as shown in FIG. 7 and FIG. 9. The cam followers 72 eventually go out of contact with the circumferences, and the shaft 71 is energized by the elastic parts to move toward the passage 7, entailing the movement of the printing unit 200 toward the passage 7. Then, as shown in FIG. 7, the printing section 37 pinches the card 1 between it and the roller 31 to perform prescribed printing and, as shown in FIG. 9, the corrective rollers 36 and 38 also pinch the card 1 between them and the rollers 28 and 34 to correct any bend or the like of the card.

Upon completion of printing, the drive unit 300 resumes rotation to turn the cams 69 and 70 in the direction of the arrows in FIG. 7 and FIG. 9 and, as shown in FIG. 6 and FIG. 8, the cam followers 72 come into contact with farther parts of the circumferences of the cams 69 and 70 from the rotation shaft 67, and the printing unit goes away from the passage 7.

Next will be taken up the erasing unit 201.

Figure 12:
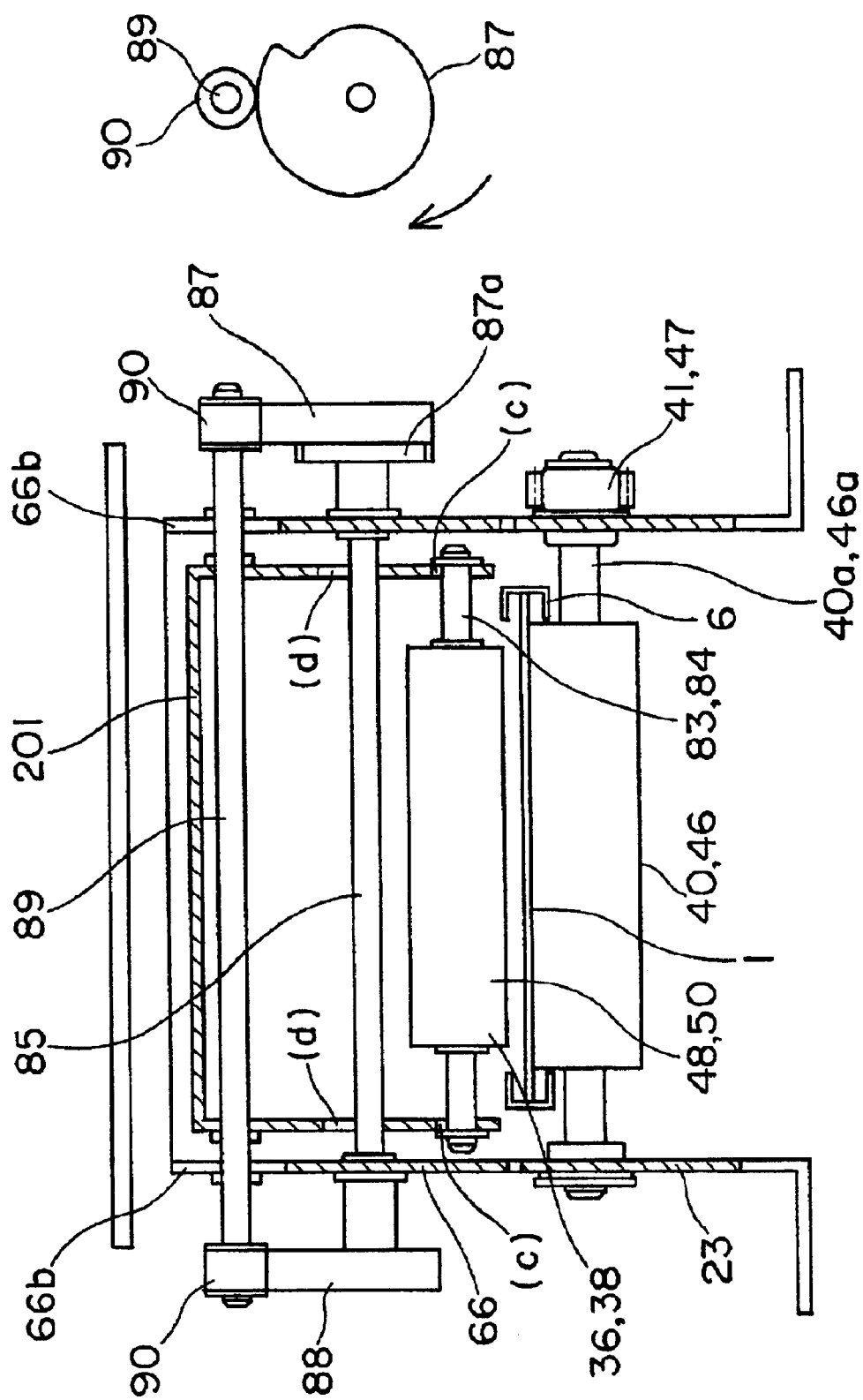
FIG. 12 is an enlarged view of the card reader in the embodiment of the present invention.

When the drive unit 301 shown in FIG. 1 starts running, a gear 92 provided in the drive unit 301 rotates, and the rotation is transmitted via an idler 91 to a gear 87a provided on a cam 87. Then, as shown in FIG. 12, as the cam 87 is fitted to a rotation shaft 85 and a cam 88 is further fitted to the rotation shaft 85, the rotation of the drive unit 301 causes the cams 87 and 88 to rotate. The rotation shaft 85 is rotatably fitted to the chassis 66.

As illustrated in FIGS. 10 through 13, the cams 87 and 88 are so shaped that the distances from the rotation shaft 85 to their circumferences be not uniform, and preferably each circumference should have a step as shown in FIGS. 10 through 13. The configuration is such that, with the rotation of the cams 87 and 88, a shaft 89 moves up and down in relation to the passage 7. The cams 87 and 88 and the shaft 89 are interlocked by cam followers 90 provided at both ends of the shaft 89. The cam followers 90 should preferably be fitted rotatably to the shaft 89 so as to reduce frictions of the cams 87 and 88 with the shaft 89.

The shaft 89 is fixed to the erasing unit 201 and moreover is inserted into a long hole 66b provided in the chassis 66, and therefore the shaft 89 is held vertically movable relative to the chassis 66. Accordingly, with the ups and downs of the shaft 89, the erasing unit 201 also moves vertically, and at least the erasing section 49 can protrude into or recede from the passage 7. Also, the erasing unit 201 is provided with two pairs of long holes (a) and (b), and shafts 80 and 81 are movably fitted to these long holes (a) and (b). To add, as described above, the shaft 80 is energized by the elastic part 93 toward the passage 7. In this arrangement, the erasing section 49 is fitted to the shafts 80 and 81 via a holder 79.

Further, as shown in FIG. 12, the erasing unit 201 is provided with a long hole (d), into which the rotation shaft 85 is inserted. This arrangement is intended to prevent the rotation shaft 85 provided in the chassis 66 from obstructing the vertical movements of the erasing unit 201.

Also, as illustrated in FIG. 12, the erasing unit 201 is provided with two long holes (c), which movably hold shafts 83 and 84, respectively. The shafts 83 and 84 are provided with the corrective rollers 40 and 46, and the shafts 83 and 94 are energized by the elastic parts 94 and 95 toward the passage 7.

The operation of the erasing unit 201 configured as described above will now be explained.

Figure 10:
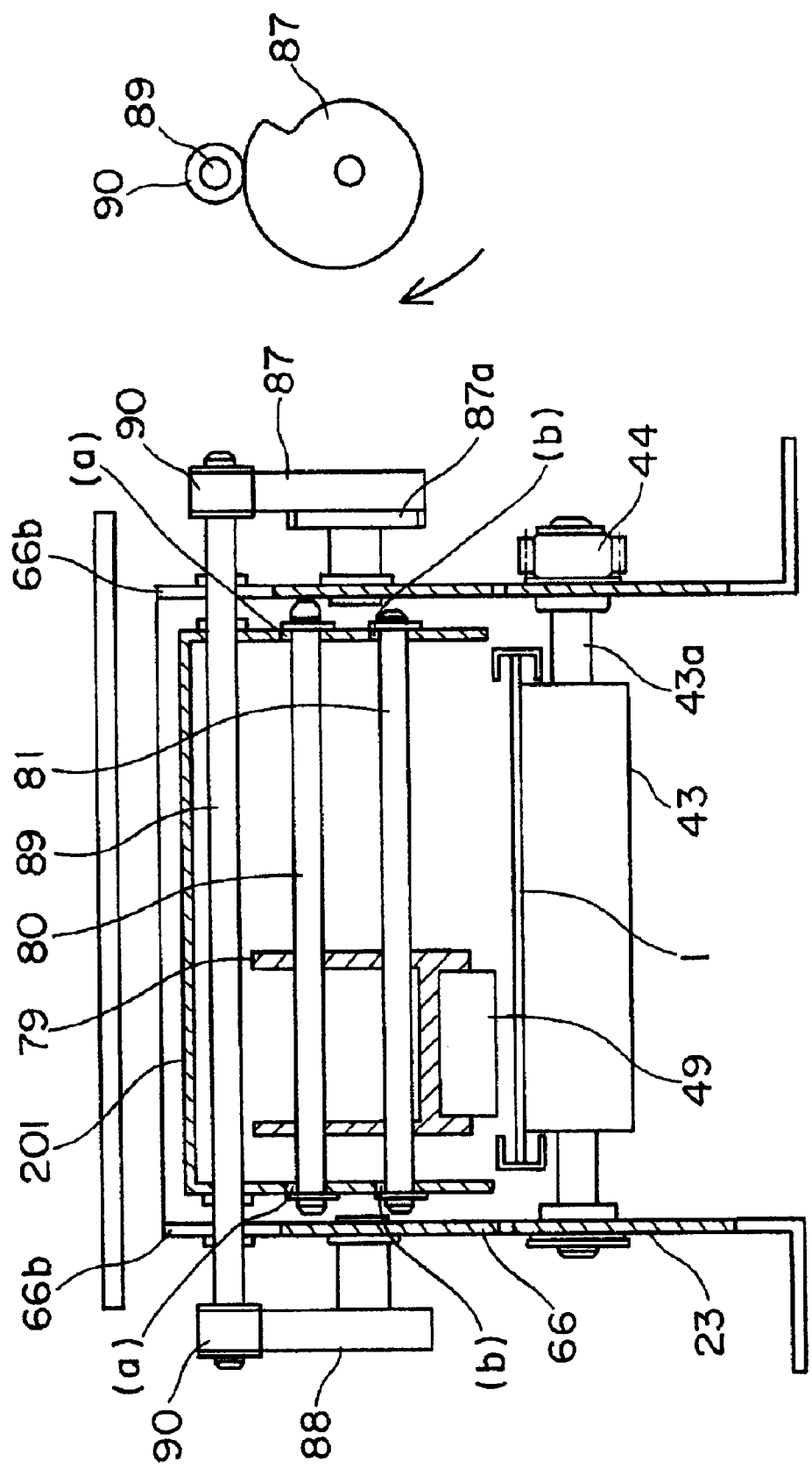
FIG. 10 is an enlarged view of the card reader in the embodiment of the present invention.

First, at least when no erasion of characters or the like printed on the card 1 is to be done by the erasing unit 201, as shown in FIG. 10 and FIG. 12, the cam followers 90 are in contact with farther parts of the circumferences of the cams 87 and 88 from the rotation shaft 85, and in this state the shaft 89 is thrust upward, entailing the arrangement of the erasing unit 201 away from the passage 7.

Figure 11:
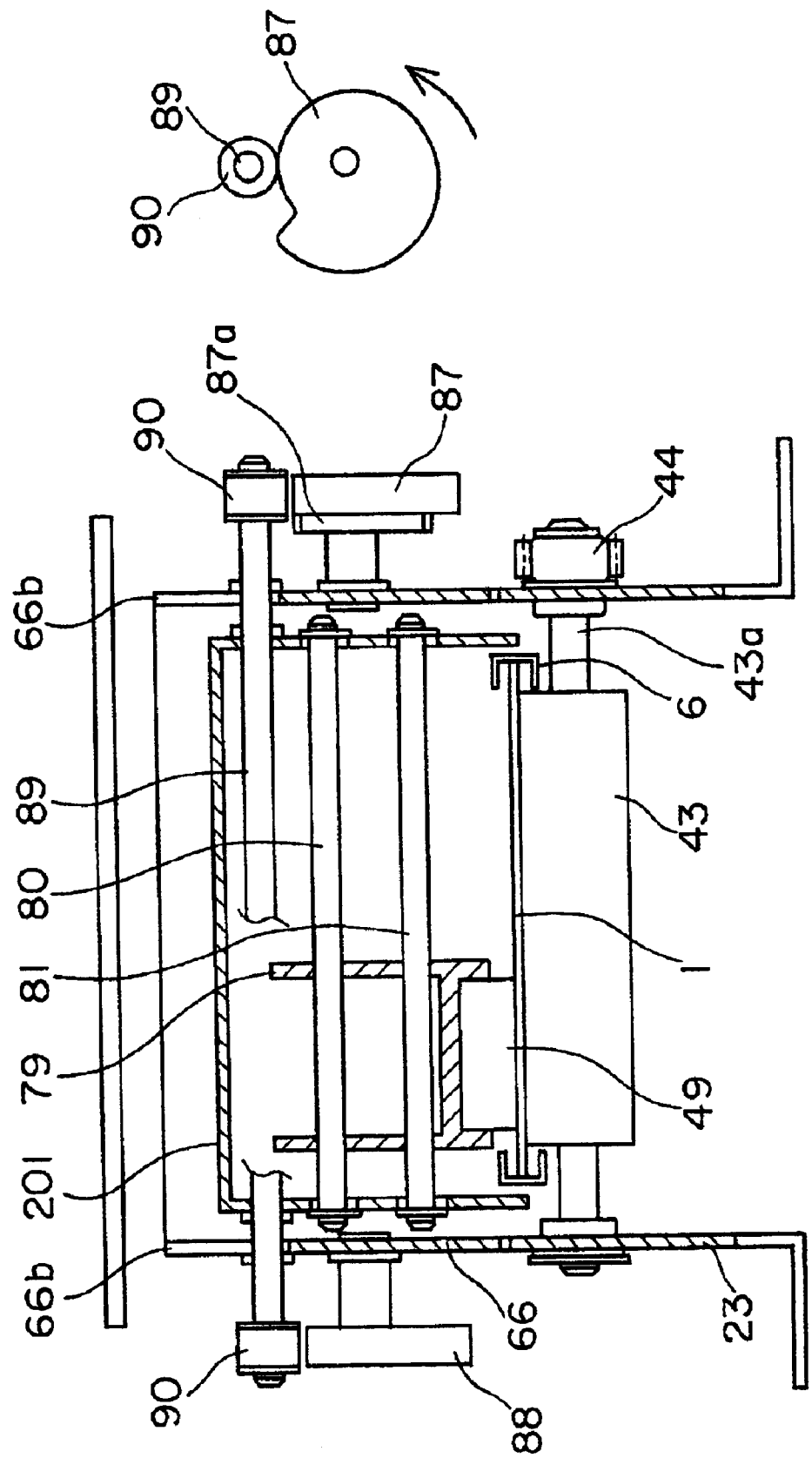
FIG. 11 is an enlarged view of the card reader in the embodiment of the present invention.
Figure 13:
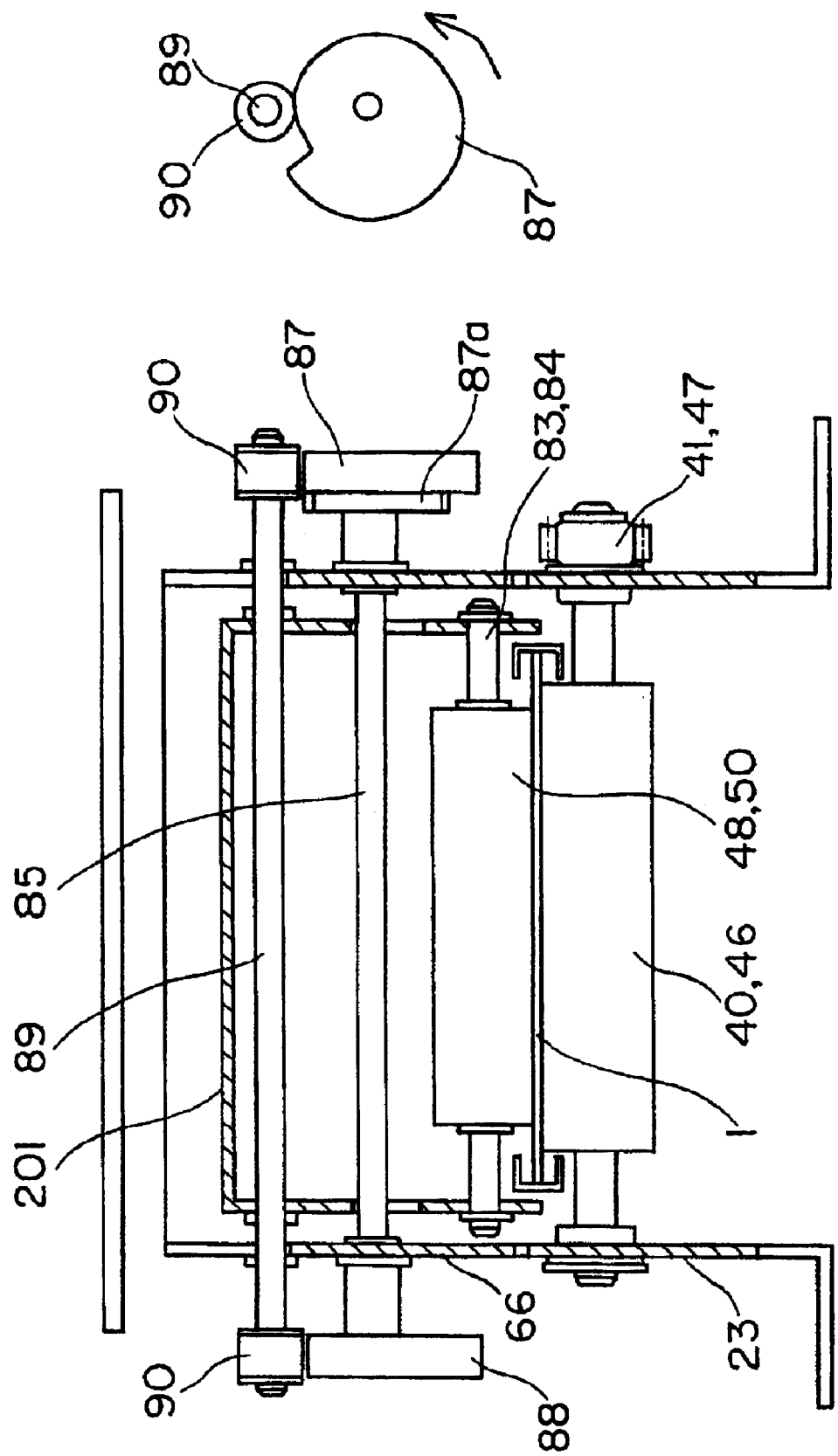
FIG. 13 is an enlarged view of the card reader in the embodiment of the present invention.

At least when erasion of characters or the like printed on the card 1 to be done, upon receipt of an erasing instruction from a control section (not shown), the drive unit 301 turns in the direction of the arrows in FIG. 10 and FIG. 12, and along with that the cam followers 90 are in contact with closer parts of the circumferences of the cams 87 and 88 to the rotation shaft 85 as shown in FIG. 11 and FIG. 13. The cam followers 90 eventually go out of contact with the circumferences, and the shaft 89 is energized by the elastic parts to move toward the passage 7, entailing the movement of the erasing unit 201 toward the passage 7. Then, as shown in FIG. 11, the erasing section 49 pinches the card 1 between it and the roller 43 to erase characters and, as shown in FIG. 13, the corrective rollers 48 and 50 also pinch the card 1 between them and the rollers 40 and 46 to correct any bend or the like of the card 1.

Upon completion of erasion, the drive unit 301 resumes rotation to turn the cams 87 and 88 in the direction of the arrows in FIG. 11 and FIG. 13 and, as shown in FIG. 10 and FIG. 12, the cam followers 90 come into contact with farther parts of the circumferences of the cams 87 and 88 from the rotation shaft 85, and the erasing unit 201 goes away from the passage 7.

Next will be taken up the IC read unit 400.

As shown in FIG. 1, the IC read unit 400 comprises the card inlet 401, the card passage 402 and the IC contact part 403.

To describe the operation of the IC read unit 400, the card 1 moved within the passage 7 by the drive roller 5 and the follower roller 12 is fed through the card inlet 401 into the card passage 402 in the IC read unit. Further the electrode of the IC contact part 403 moves toward the electrode connected to the IC on the surface of the card 1, and comes into contact with the electrode of the card 1 to reliably perform at least either recording or reproduction of data.

Next will be described an example of card 1 handling method.

First, upon detection of the insertion of the card 1 by a sensor (not shown; an optical sensor or the like) provided near the inlet 2, a control section (not shown) first actuates the drive unit 51 for rotation, and along with that turns the drive rollers 3, 4 and 5 and the rollers 31, 34, 28, 40, 43 and 46 to take the card 1 into the apparatus. After that, data recorded on the card 1 are read by the data recording/reproducing unit (a magnetic head in this embodiment) 56, and the card 1 enters through the card inlet 401 of the IC read unit 400 to be fed into the card passage 402. Recorded data are read through the electrode connected to the IC on the surface of the card 1 from the electrode of the IC contact part 403, and data are further recorded if necessary.

After that, the control section reverses the turning direction of the drive unit 51 and moves the card 1 toward the inlet 2. At this time, the data recording/reproducing unit 56 writes data. Further after that, the control section again reverses the turning direction of the drive unit 51 to move the card 1 toward the drive unit 51, again reads data recorded on the card 1 then, and checks if there is no data recording error (verification). Thus during recording or reproduction of data onto or out of the card 1, the printing unit 200 and the erasing unit 201 are away from the passage 7, and accordingly the corrective rollers, the printing section 37 and the erasing section 49 are also away from the passage 7. As a result, the card 1 is moved smoothly, no trouble occurs in recording or reproduction of data, and moreover the card 1 is kept out of contact with the corrective rollers which would otherwise forcefully pinch the card 1, so that the duration of contact between the card 1 and the corrective rollers can be reduced with the effect of extending the useful life of the card 1.

Next, after the verification of the card 1 is completed, the card 1 moves to the rear end of the passage 7 and, if it is required after that to erase characters or the like printed on the card 1, the control section reverses the turning direction of the drive unit 51 to move the card 1 toward the inlet 2. At the same time, the control section actuates the drive unit 301 to move the erasing unit 201 toward the passage 7 to pinch the card 1 between the corrective rollers 48 and 50 to correct any bend or the like of the card 1, and causes the erasing section 49 to erase characters or the like printed on the card 1. As the corrective rollers 48 and 50 then correct any bend or the like of the card 1, excellent erasing performance can be achieved.

Next, if it is required to print prescribed characters or the like on the card 1, the control section actuates the drive unit 300 for rotation to move the printing unit 200 toward the passage 7. Then, the card 1 undergoes correction of any bend or the like by the corrective rollers 36 and 38 and printing of prescribed characters by the printing section 37, and is discharged outside through the inlet. Upon detection of the discharge of the card 1 by the sensor, running of the drive unit 51 is discontinued.

Here will be described how the type of a given card 1 is identified. For instance to determine the thickness of the card 1, it can be accomplished, in the above-described handling process, by reading data recorded on the card 1 with the data recording/reproducing unit (a magnetic head in this embodiment) 56. The thickness can as well be determined with a sensor.

To describe it by way of a specific example, where the card 1 for instance is 0.68 to 0.84 mm thick (i.e. it is a thicker card) and has a magnetic recording layer, an IC memory and a marking section, data on the type or the like recorded on the magnetic recording layer of the card 1 are read with the data recording/reproducing unit (a magnetic head in this embodiment) 56; its thickness and other features are determined; and the findings are delivered to and processed by the IC read unit 400, and further processed by the erasing unit 201 and the printing unit 200.

Or where the card 1 is 0.20 to 0.28 mm thick (i.e. it is a thinner card) and has a magnetic recording layer and a marking section but no IC memory, data on the type or the like recorded on the magnetic recording layer of the card 1 are read with the data recording/reproducing unit (a magnetic head in this embodiment) 56; its thickness and other features are determined; and the findings are processed by the erasing unit 201 and the printing unit 200 without being delivered to the IC read unit 400.

The features of the card 1 that are determined include the use, information recording method, marking method, material of its substrate, position of the memory section such as a magnetic stripe or IC chip, and standards such as the card size and thickness, and obviously these features are determined to make possible a way of handling that matches each determined feature.

By reading and determining the features of the card with the data recording/reproducing unit (a magnetic head in this embodiment) 56 in this manner, handling for each of different types of cards which require different ways of processing can be automated reliably.

As hitherto described, the card reader according to the present invention dispenses with the need to make ready a plurality of card readers each matching a different type of card, but can by itself handle a plurality of types of cards.

Therefore the invention can provide a card reader adaptable to a wide variety of cards differing in thickness, having or not having any of the functions to display a visible image, magnetic recording/reproduction and IC recording/reproduction and excelling in card carrying ease.

What is claimed is:

1. A card reader operable to handle cards differing in thickness, said card reader comprising:
    a card passage;
    a carrier for moving a card present within said passage;
    data recording/reproducing means for at least either recording data onto or reproducing data out of the card;
    an image former for forming a visible image on the card; and
    an image eraser for erasing any visible image formed on the card, wherein:
        said data recording/reproducing means determines the thickness of the card by reading data recorded on the card.

2. The card reader as set forth in claim 1, wherein elastic parts are provided opposite said data recording/reproducing means.

3. The card reader as set forth in claim 1, wherein at least one of said image former and said image eraser is operable to protrude into and recede from said passage.

4. The card reader as set forth in claim 1, wherein a pinching load of said image former on the card ranges from 3 N to 50 N.

5. The card reader as set forth in claim 1, wherein a pinching load of said image eraser on the card ranges from 3 N to 50 N.

6. The card reader as set forth in claim 1, wherein a corrector for correcting any warp, bend or the like of the card is operable to protrude into and recede from said passage.

7. The card reader as set forth in claim 6, wherein the corrector is away from the passage at least when the data recording/reproducing means is recording or reproducing data onto or out of the card.

8. The card reader as set forth in claim 6, wherein the corrector comprises a pair of rollers, each of which can protrude into and recede from the passage, and the rollers pinch the card between them for correction.

9. The card reader as set forth in claim 6, wherein a pinching load of said corrector on the card ranges from 3 N to 50 N.

10. The card reader as set forth in claim 1, wherein a pinching load of said image former on the card ranges from 6 N to 50 N.

11. The card reader as set forth in claim 1, wherein a pinching load of said image, eraser on the card ranges from 13 N to 50 N.

* * * * *